(12) United States Patent
Keefer

(10) Patent No.: US 7,097,925 B2
(45) Date of Patent: Aug. 29, 2006

(54) HIGH TEMPERATURE FUEL CELL POWER PLANT

(75) Inventor: Bowie G. Keefer, Galiano Island (CA)

(73) Assignee: QuestAir Technologies Inc., Burnaby (CA)

( * ) Notice: Subject to any disclaimer, the term of this patent is extended or adjusted under 35 U.S.C. 154(b) by 259 days.

(21) Appl. No.: 10/352,361

(22) Filed: Jan. 27, 2003

(65) Prior Publication Data

US 2003/0143448 A1 Jul. 31, 2003

Related U.S. Application Data

(63) Continuation-in-part of application No. 10/039,940, filed on Oct. 26, 2001.

(60) Provisional application No. 60/351,798, filed on Jan. 25, 2002, provisional application No. 60/323,169, filed on Sep. 17, 2001.

(30) Foreign Application Priority Data

Oct. 30, 2000 (CA) .................................. 2325072

(51) Int. Cl.
*H10M 8/12* (2006.01)
*H01M 8/24* (2006.01)

(52) U.S. Cl. ............................ 429/9; 429/30; 429/34

(58) Field of Classification Search ................ 429/13, 429/17, 19, 20, 30, 31, 34, 9
See application file for complete search history.

(56) References Cited

U.S. PATENT DOCUMENTS

| | | | |
|---|---|---|---|
| 3,094,569 A | 6/1963 | Thomas | |
| 3,204,388 A | 9/1965 | Asker | |
| 3,430,418 A | 3/1969 | Wagner | |
| 3,513,631 A | 5/1970 | Siebert et al. | |
| 3,564,816 A | 2/1971 | Batta | |
| 3,594,984 A | 7/1971 | Toyama et al. | |
| 3,847,672 A | 11/1974 | Trocciola et al. | |
| 3,865,924 A | 2/1975 | Gidaspow et al. | |
| 4,019,879 A | 4/1977 | Rabo et al. | |
| 4,144,037 A | 3/1979 | Armond et al. | |
| 4,153,434 A | 5/1979 | Settlemyer | |
| 4,200,682 A | 4/1980 | Sederquist | |
| 4,272,265 A | 6/1981 | Snyder | |

(Continued)

FOREIGN PATENT DOCUMENTS

CA 1256038 6/1989

(Continued)

OTHER PUBLICATIONS

Chatsiriwech et al., "Enhancement of Catalytic Reaction by Pressure Swing Adsorption," *Catalysis Today* 20, Elsevier Science, pp. 351-366 (1994), month unknown.

(Continued)

*Primary Examiner*—Stephen J. Kalafut
(74) *Attorney, Agent, or Firm*—Klarquist Sparkman, LLP

(57) ABSTRACT

Disclosed is a high temperature fuel cell power generation system that includes a high temperature fuel cell having an anode inlet and exhaust, and a cathode inlet and exhaust. The system also includes a gas separation means operable to recover hydrogen gas from the anode exhaust and to provide at least a portion of such hydrogen gas for recycle to the anode inlet. The system further includes energy recovery means operable to recover energy from the fuel cell exhaust gases and to provide at least a portion of such recovered energy to drive mechanical loads associated with the operation of the gas separation means, wherein a portion of the recovered hydrogen gas is provided for export from the generation system as hydrogen fuel.

30 Claims, 17 Drawing Sheets

U.S. PATENT DOCUMENTS

| | | | |
|---|---|---|---|
| 4,322,394 A | 3/1982 | Mezey et al. | |
| 4,354,859 A | 10/1982 | Keller et al. | |
| 4,406,675 A | 9/1983 | Dangieri et al. | |
| 4,452,612 A | 6/1984 | Mattia | |
| 4,530,705 A | 7/1985 | Firey | |
| 4,532,192 A | 7/1985 | Baker et al. | |
| 4,553,981 A | 11/1985 | Fuderer | |
| 4,555,453 A | 11/1985 | Appleby | |
| 4,578,214 A | 3/1986 | Jungerhans | |
| 4,587,114 A | 5/1986 | Hirai et al. | |
| 4,595,642 A | 6/1986 | Nakanishi et al. | |
| 4,696,682 A | 9/1987 | Hirai et al. | |
| 4,702,903 A | 10/1987 | Keefer | |
| 4,726,816 A | 2/1988 | Fuderer | |
| 4,743,276 A | 5/1988 | Nishida et al. | |
| 4,758,253 A | 7/1988 | Davidson et al. | |
| 4,759,997 A | 7/1988 | Ohyauchi et al. | |
| 4,781,735 A | 11/1988 | Tagawa et al. | |
| 4,783,433 A | 11/1988 | Tajima et al. | |
| 4,790,858 A | 12/1988 | Sircar | |
| 4,801,308 A | 1/1989 | Keefer | |
| 4,816,121 A | 3/1989 | Keefer | |
| 4,914,076 A | 4/1990 | Tsuji et al. | |
| 4,917,711 A | 4/1990 | Xie et al. | |
| 4,963,339 A | 10/1990 | Krishnamurthy et al. | |
| 4,968,329 A | 11/1990 | Keefer | |
| 4,969,935 A | 11/1990 | Hay | |
| 4,988,580 A | 1/1991 | Ohsaki et al. | |
| 4,994,331 A | 2/1991 | Cohen | |
| 5,068,159 A | 11/1991 | Kinoshita | |
| 5,079,103 A | 1/1992 | Schramm | |
| 5,082,473 A | 1/1992 | Keefer | |
| 5,096,469 A | 3/1992 | Keefer | |
| 5,096,470 A | 3/1992 | Krishnamurthy | |
| 5,126,310 A | 6/1992 | Golden et al. | |
| 5,133,784 A | 7/1992 | Boudet et al. | |
| 5,147,735 A | 9/1992 | Ippommatsu et al. | |
| 5,175,061 A | 12/1992 | Hildebrandt et al. | |
| 5,227,598 A | 7/1993 | Woodmansee et al. | |
| 5,245,110 A | 9/1993 | Van Dijk et al. | |
| 5,246,676 A | 9/1993 | Hay | |
| 5,248,325 A | 9/1993 | Kagimoto et al. | |
| 5,256,172 A | 10/1993 | Keefer | |
| 5,256,174 A | 10/1993 | Kai et al. | |
| 5,258,571 A | 11/1993 | Golden et al. | |
| 5,271,916 A | 12/1993 | Vanderborgh et al. | |
| 5,282,886 A | 2/1994 | Kobayashi et al. | |
| 5,306,575 A * | 4/1994 | Camara et al. | 429/17 X |
| 5,328,503 A | 7/1994 | Kumar et al. | |
| 5,360,679 A | 11/1994 | Buswell et al. | |
| 5,366,818 A | 11/1994 | Wilkinson et al. | |
| 5,393,326 A | 2/1995 | Engler et al. | |
| 5,411,578 A | 5/1995 | Watson et al. | |
| 5,415,748 A | 5/1995 | Emiliani et al. | |
| 5,429,665 A | 7/1995 | Botich | |
| 5,431,716 A | 7/1995 | Ebbeson | |
| 5,434,016 A | 7/1995 | Benz et al. | |
| 5,441,559 A | 8/1995 | Petit et al. | |
| 5,487,775 A | 1/1996 | LaCava et al. | |
| 5,509,956 A | 4/1996 | Opperman et al. | |
| 5,523,326 A | 6/1996 | Dandekar et al. | |
| 5,529,763 A | 6/1996 | Peng et al. | |
| 5,529,970 A | 6/1996 | Peng | |
| 5,531,809 A | 7/1996 | Golden et al. | |
| 5,543,238 A | 8/1996 | Strasser | |
| 5,593,478 A | 1/1997 | Hill et al. | |
| 5,604,047 A | 2/1997 | Bellows et al. | |
| 5,632,807 A | 5/1997 | Tomita et al. | |
| 5,645,950 A | 7/1997 | Benz et al. | |
| 5,646,305 A | 7/1997 | Wagner et al. | |
| 5,656,067 A | 8/1997 | Watson et al. | |
| 5,658,370 A | 8/1997 | Vigor et al. | |
| 5,711,926 A | 1/1998 | Knaebel | |
| 5,714,276 A | 2/1998 | Okamoto | |
| 5,766,311 A | 6/1998 | Ackley et al. | |
| 5,811,201 A | 9/1998 | Skowronski | |
| 5,827,358 A | 10/1998 | Kulish et al. | |
| 5,876,486 A | 3/1999 | Steinwandel et al. | |
| 5,877,600 A * | 3/1999 | Sonntag | 429/23 X |
| 5,891,217 A | 4/1999 | Lemcoff et al. | |
| 5,900,329 A | 5/1999 | Reiter et al. | |
| 5,917,136 A | 6/1999 | Gaffney et al. | |
| 5,925,322 A | 7/1999 | Werth | |
| 5,955,039 A | 9/1999 | Dowdy | |
| 5,958,109 A | 9/1999 | Fuderer | |
| 5,968,680 A | 10/1999 | Wolfe et al. | |
| 5,980,857 A | 11/1999 | Kapoor et al. | |
| 5,981,096 A | 11/1999 | Hornberg et al. | |
| 5,998,056 A | 12/1999 | Divisek et al. | |
| 6,022,399 A | 2/2000 | Ertl et al. | |
| 6,045,933 A | 4/2000 | Okamoto | |
| 6,051,050 A | 4/2000 | Keefer et al. | |
| 6,056,804 A | 5/2000 | Keefer et al. | |
| 6,060,032 A | 5/2000 | Hable et al. | |
| 6,063,161 A | 5/2000 | Keefer et al. | |
| 6,077,620 A | 6/2000 | Pettit | |
| 6,090,312 A | 7/2000 | Ziaka et al. | |
| 6,143,057 A | 11/2000 | Bülow et al. | |
| 6,162,558 A | 12/2000 | Borup et al. | |
| 6,176,897 B1 | 1/2001 | Keefer | |
| 6,190,623 B1 | 2/2001 | Sanger et al. | |
| 6,190,791 B1 | 2/2001 | Hornburg | |
| 6,200,365 B1 | 3/2001 | Eimer et al. | |
| 6,210,822 B1 | 4/2001 | Abersfelder et al. | |
| 6,231,644 B1 | 5/2001 | Jain et al. | |
| 6,255,010 B1 | 7/2001 | George et al. | |
| 6,280,865 B1 * | 8/2001 | Eisman et al. | 429/17 |
| 6,283,723 B1 | 9/2001 | Milburn et al. | |
| 6,293,998 B1 | 9/2001 | Dolan et al. | |
| 6,296,823 B1 | 10/2001 | Ertl et al. | |
| 6,312,843 B1 | 11/2001 | Kimbara et al. | |
| 6,358,300 B1 | 3/2002 | Fornof et al. | |
| 6,398,853 B1 | 6/2002 | Keefer et al. | |
| 6,406,523 B1 | 6/2002 | Connor et al. | |
| 6,428,915 B1 | 8/2002 | Ban et al. | |
| 6,492,048 B1 * | 12/2002 | Draper et al. | 429/30 |
| 6,607,854 B1 * | 8/2003 | Rehg et al. | 429/17 X |
| 6,667,128 B1 | 12/2003 | Edlund | |
| 6,692,545 B1 | 2/2004 | Gittleman et al. | |
| 2001/0047824 A1 | 12/2001 | Hill et al. | |
| 2002/0004157 A1 | 1/2002 | Keefer et al. | |
| 2002/0098394 A1 | 7/2002 | Keefer et al. | |
| 2002/0104518 A1 | 8/2002 | Keefer et al. | |
| 2002/0110503 A1 | 8/2002 | Gittleman et al. | |
| 2002/0110504 A1 | 8/2002 | Gittleman et al. | |
| 2002/0112479 A1 | 8/2002 | Keefer et al. | |
| 2002/0127442 A1 | 9/2002 | Connor et al. | |
| 2002/0142198 A1 | 10/2002 | Towler et al. | |
| 2002/0142208 A1 | 10/2002 | Keefer et al. | |
| 2003/0143448 A1 | 7/2003 | Keefer et al. | |
| 2003/0157390 A1 | 8/2003 | Keefer et al. | |
| 2004/0005492 A1 | 1/2004 | Keefer et al. | |

FOREIGN PATENT DOCUMENTS

| | | |
|---|---|---|
| CA | 2016045 | 8/1994 |
| CA | 2109055 | 2/1999 |
| CA | 2087972 | 1/2000 |
| CA | 2087973 | 1/2001 |
| DE | 3913 581 A1 | 11/1990 |
| EP | 0 341 189 A1 | 8/1989 |
| EP | 0 345 908 | 12/1989 |
| EP | 0 143 537 A2 | 3/1990 |
| EP | 0 143 537 B1 | 3/1990 |

| | | | |
|---|---|---|---|
| EP | 0 681 860 A2 | 7/1996 |
| EP | 0 691 701 A1 | 10/1996 |
| EP | 0 737 648 | 10/1996 |
| EP | 0 750 361 A | 12/1996 |
| EP | 0 751 045 | 1/1997 |
| EP | 0 853 967 | 7/1998 |
| EP | 1 095 689 A1 | 10/1999 |
| EP | 1 070 531 A2 | 1/2001 |
| EP | 1 172 772 | 1/2002 |
| GB | 2 042 365 | 9/1980 |
| JP | 59075574 A | 4/1984 |
| JP | 62-274561 | * 11/1987 |
| JP | 62 274561 | 11/1987 |
| JP | 62 278770 | 12/1987 |
| JP | 63 166137 | 7/1988 |
| JP | 63 228572 A | 9/1988 |
| JP | 04 206161 A | 7/1992 |
| JP | 05 166528 | 7/1993 |
| JP | 07094200 | 7/1995 |
| JP | 80 45526 A2 | 2/1996 |
| JP | 8045526 A2 | 2/1996 |
| JP | 10 027621 A | 1/1998 |
| JP | 10 325360 A | 12/1998 |
| JP | 10325360 A | 12/1998 |
| JP | 11214021 A2 | 8/1999 |
| WO | WO 94/04249 | 8/1992 |
| WO | WO 96/13871 | 5/1996 |
| WO | WO 98/29182 | 9/1998 |
| WO | WO 99/01202 | 1/1999 |
| WO | WO 99/19249 | 4/1999 |
| WO | WO 99/28013 | 6/1999 |
| WO | WO 99/46032 | 9/1999 |
| WO | WO 00/16425 | 3/2000 |
| WO | WO 00/16880 | 3/2000 |
| WO | WO 00/76630 | 12/2000 |
| WO | WO 01/47050 | 6/2001 |
| WO | WO 02/24309 | 3/2002 |
| WO | WO 02/35623 | 5/2002 |
| WO | WO 02/37590 | 5/2002 |
| WO | WO 02/45821 | 6/2002 |
| WO | WO 02/47797 | 6/2002 |
| WO | WO 02/56400 | 7/2002 |

OTHER PUBLICATIONS

Hufton et al., "Sorption Enhanced Reaction Process for Hydrogen Production," *AIChE Journal*, vol. 45 No. 2, pp. 248-256 (Feb. 1999).
Carvill et al., *AIChE J.* 42(10):2765-2772, 1996.
Ding et al., *Chemical Engineering Science* 55:3461-3474, 2000.
Ding et al., *Chemical Engineering Science* 55:3929-3940, 2000.
Iyuke et al., *Chemical Engineering Science* 55:4745-4755, 2000.
International Search Report from International Application No. PCT/CA99/00823.
International Search Report from International Application No. PCT/CA02/00368.

* cited by examiner

HIGH TEMPERATURE FUEL CELL POWER PLANT

PRIORITY CLAIM

This patent application is a continuation-in-part of U.S. patent application Ser. No. 10/039,940 filed on 26 Oct. 2001, incorporated herein by reference, which in turn claims priority to U.S. Provisional Application No. 60/323,169, filed Sep. 17, 2001, and Canadian Patent Application number 2,325,072, filed Oct. 30, 2000. The present application also claims priority to U.S. Provisional Application No. 60/351,798, filed Jan. 25, 2002.

FIELD

The present disclosure relates to a fuel cell-based electrical generation system, which employs pressure swing adsorption for enhancing the energy efficiency of fuel cells, particularly high temperature fuel cells such as solid oxide and molten carbonate fuel cells.

BACKGROUND

Fuel cells provide an environmentally friendly source of electrical current. One type of high temperature fuel cell used for generating electrical power, particularly envisaged for larger scale stationary power generation, is the molten carbonate fuel cell (MCFC). The MCFC includes an anode channel for receiving a flow of hydrogen gas (or a fuel gas which reacts in the anode channel to generate hydrogen by steam reforming and water gas shift reactions), a cathode channel for receiving a flow of oxygen gas, and a porous matrix containing a molten carbonate electrolyte which separates the anode channel from the cathode channel. Oxygen and carbon dioxide in the cathode channel react to form carbonate ions, which cross the electrolyte to react with hydrogen in the anode channel to generate a flow of electrons. As the hydrogen is consumed, carbon monoxide is shifted by steam to generate additional hydrogen. Carbon dioxide and water vapor are produced in the anode channel by oxidation of fuel components, and by reduction of carbonate ions from the electrolyte. Typical operating temperature of molten carbonate fuel cells is about 650° C.

Another type of high temperature fuel cell is the solid oxide fuel cell (SOFC). The SOFC includes an anode channel for receiving a flow of hydrogen gas (or a fuel gas which reacts in the anode channel to generate hydrogen by steam reforming and water gas shift reactions), a cathode channel for receiving a flow of oxygen gas, and a solid electrolyte which is a ceramic membrane conductive to oxygen ions and separates the anode channel from the cathode channel. Oxygen in the cathode channel dissociates to oxygen ions, which cross the electrolyte to react with hydrogen in the anode channel to generate a flow of electrons. As the hydrogen is consumed, carbon monoxide may be oxidized directly or may be shifted by steam to generate additional hydrogen. Carbon dioxide and water vapor are produced in the anode channel by oxidation of fuel components. Typical operating temperature of solid oxide fuel cells is about 500° to about 1000° C.

Except in the rare instance that hydrogen (e.g. recovered from refinery or chemical process off-gases, or else generated from renewable energy by electrolysis of water) is directly available as fuel, hydrogen must be generated from fossil fuels by an appropriate fuel processing system. For stationary power generation, it is preferred to generate hydrogen from natural gas by steam reforming or partial oxidation to produce "syngas" comprising a mixture of hydrogen, carbon monoxide, carbon dioxide, steam and some unreacted methane. As hydrogen is consumed in the fuel cell anode channel, much of the carbon monoxide reacts with steam by water gas shift to generate more hydrogen and more carbon dioxide. Other carbonaceous feedstocks (e.g. heavier hydrocarbons, coal, or biomass) may also be reacted with oxygen and steam to generate syngas by partial oxidation, gasification or autothermal reforming. The fuel cell may also be operated on hydrogen or syngas that has been generated externally.

A great advantage of MCFC and SOFC systems is that their high operating temperature facilitates close thermal integration between the fuel cell and the fuel processing system. The high temperature also allows the elimination of noble metal catalysts required by lower temperature fuel cells.

Prior art MCFC systems have serious limitations associated with their high temperature operation, and with their inherent need to supply carbon dioxide to the cathode while removing it from the anode. Prior art SOFC systems face even more challenging temperature regimes, and are disadvantaged by the degradation of cell voltages at very high temperatures under conventional operating conditions.

The lower heat of combustion of a fuel usefully defines the energy (enthalpy change of the reaction) that may be generated by oxidizing that fuel. The electrochemical energy that can be generated by an ideal fuel cell is however the free energy change of the reaction, which is smaller than the enthalpy change. The difference between the enthalpy change and the free energy change is the product of the entropy change of the reaction multiplied by the absolute temperature. This difference widens at higher temperatures, so higher temperature fuel cells inherently convert a lower fraction of the fuel energy to electrical power at high efficiency, while a larger fraction of the fuel energy is available only as heat which must be converted to electrical power by a thermodynamic bottoming cycle (e.g. steam or gas turbine plant) at lower efficiency.

Accumulation of reforming reaction products (carbon dioxide and steam) on the fuel cell anode opposes the electrochemical reaction, so that the free energy is reduced. Higher partial pressure of oxygen and carbon dioxide over the cathode, and higher partial pressure of hydrogen over the anode, drive the reaction forward so that the free energy is increased. Unfortunately, the reaction depletes the oxygen and carbon dioxide in the cathode channel and depletes hydrogen in the anode channel while rapidly increasing the backpressure of carbon dioxide in the anode channel. Hence the free energy change is reduced, directly reducing the cell voltage of the fuel stack. This degrades the electrical efficiency of the system, while increasing the heat that must be converted at already lower efficiency by the thermal bottoming cycle.

The free energy change is simply the product of the electromotive force ("E") of the cell and the charge transferred per mole by the reaction ("2F"), where the factor of two reflects the valency of the carbonate ion. The following Nernst relation for a MCFC expresses the above described sensitivity of the electromotive force to the partial pressures of the electrochemical reactants in the anode and cathode channels, where the standard electromotive force ("$E_o$") is referred to all components at standard conditions and with water as vapor.

$$E = E_o - \frac{RT}{2F} \ln\left[\frac{P_{H2O(anode)} \cdot P_{CO2(anode)}}{P_{H2(anode)} \cdot P_{O2(cathode)}^{0.5} \cdot P_{CO2(cathode)}}\right]$$

Prior art MCFC systems do not provide any satisfactory solution for this problem which gravely compromises attainable overall efficiency. Despite repeated attempts to devise an effective technology and method to maximize reactant concentrations, and minimize product accumulation in both the anode and cathode circuits that would be compatible with MCFC operating conditions, no such attempt has been adequately successful.

The accepted method for supplying carbon dioxide to the MCFC cathode has been to burn a fraction of the anode exhaust gas (including unreacted hydrogen and other fuel components) to provide carbon dioxide mixed with steam and nitrogen to be mixed with additional air providing oxygen to the cathode. This approach has serious limitations. Even more of the original fuel value is unavailable for relatively efficient electrochemical power generation, in view of additional combustion whose heat can only be absorbed usefully by the thermal bottoming cycle. Also, the oxygen/nitrogen ratio of the cathode gas is even more dilute than ambient air, further reducing cell voltage and hence transferring more power generation load less efficiently onto the thermal bottoming plant.

The following Nernst relation for a SOFC expresses the sensitivity of the electromotive force to the partial pressures of the electrochemical reactants in the anode and cathode channels, with the simplifying assumption that CO is converted by the water gas shift reaction. This sensitivity is of course greatest at the highest working temperatures of SOFC.

$$E = E_o - \frac{RT}{2F} \ln\left[\frac{P_{H2O(anode)}}{P_{H2(anode)} \cdot P_{O2(cathode)}^{0.5}}\right]$$

Pressure swing adsorption (PSA) systems are one possibility for providing fuel gases to a fuel cell. PSA systems and vacuum pressure swing adsorption systems (VPSA) separate gas fractions from a gas mixture by coordinating pressure cycling and flow reversals over an adsorber or adsorbent bed which preferentially adsorbs a more readily adsorbed gas component relative to a less readily adsorbed gas component of the mixture. The total pressure of the gas mixture in the adsorber is elevated while the gas mixture is flowing through the adsorber from a first end to a second end thereof, and is reduced while the gas mixture is flowing through the adsorbent from the second end back to the first end. As the PSA cycle is repeated, the less readily adsorbed component is concentrated adjacent the second end of the adsorber, while the more readily adsorbed component is concentrated adjacent the first end of the adsorber. As a result, a "light" product (a gas fraction depleted in the more readily adsorbed component and enriched in the less readily adsorbed component) is delivered from the second end of the adsorber, and a "heavy" product (a gas fraction enriched in the more strongly adsorbed component) is exhausted from the first end of the adsorber.

However, the conventional system for implementing pressure swing adsorption or vacuum pressure swing adsorption uses two or more stationary adsorbers in parallel, with multiple two-way directional valves at each end of each adsorber to connect the adsorbers in alternating sequence to pressure sources and sinks. This system is often cumbersome and expensive to implement due to the large size of the adsorbers and the complexity of the valving required. The valves would not be capable of operation at MCFC working temperatures. Further, the conventional PSA system makes inefficient use of applied energy because of irreversible gas expansion steps as adsorbers are cyclically pressurized and depressurized within the PSA process. Conventional PSA systems are bulky and heavy because of their low cycle frequency and consequent large adsorbent inventory. In addition, prior art PSA and adsorbent technology may not be capable of operation at such high temperature.

Combined cycle power plants with a gas turbine cycle integrated with a fuel cell system have been disclosed. In addition, commonly-assigned PCT Published International Patent Application No. WO 00/16425 provides examples of how PSA units may be integrated with gas turbine power plants, or with fuel cell power plants having a gas turbine auxiliary engine.

A further shortcoming of high temperature fuel cell power plant systems known in the prior art is the inability of such previously known systems to provide means for effective mitigation of "greenhouse" gas and other environmentally deleterious gas emissions resulting from fossil-fuel derived power generation.

SUMMARY

Disclosed herein are MCFC or SOFC based generation systems which address some of the deficiencies of the prior art. Also disclosed are MCFC or SOFC generation systems adapted to manipulate reactant concentrations for enhanced performance and economics, and MCFC systems more particularly adapted to efficiently transfer carbon dioxide from the anode to the cathode while enhancing electrical power output. MCFC or SOFC electrical generation systems adapted to enable selective generation of electrical power, and/or hydrogen fuel, and/or useable heat, allowing flexible operation of the generation system while incorporating means for mitigation of "greenhouse" gas and other environmentally deleterious gas emissions, and enhancing overall efficiency of operation to increase sustainability of fuel resource use, are also disclosed herein.

According to a first embodiment of the disclosed systems and processes, there is provided an electrical current generating system that includes at least one fuel cell operating at a temperature of at least about 250° C., a hydrogen gas separation system and/or oxygen gas delivery system that includes at least one device selected from a compressor or vacuum pump, and a drive system for the device that includes means for recovering energy from at least one of the hydrogen gas separation system, oxygen gas delivery system, or heat of the fuel cell. According to a second embodiment of an electrical current generating system that also includes a high temperature fuel cell, a gas turbine system may be coupled to the hydrogen gas separation system or oxygen gas delivery system, wherein the gas turbine system is powered by energy recovered from at least one of the hydrogen gas separation system, oxygen gas delivery system, or heat of the fuel cell. The hydrogen gas separation system or the oxygen gas delivery system may include a pressure swing adsorption module. These generating systems are particularly useful with molten carbonate fuel cells and solid oxide fuel cells.

In such a generating system, the energy recovery means may include a gas turbine and/or a heat exchanger that receives a heated and/or pressurized gas stream from the hydrogen gas separation system, oxygen gas delivery system, or fuel cell. For example, a fuel cell heat recovery system may be coupled to the fuel cell and to the gas turbine system (in this case, a hydrogen gas separation system is optional). The energy recovery means translates the recovered thermal and pressure energy into a drive force for operating the compressor and vacuum pump. For example, a pressure swing adsorption module could establish a pressure gradient in a fuel-containing gas stream under conditions sufficient for separating the fuel-containing gas stream into a fuel-enriched gas stream and a fuel-depleted gas stream. At least one of the fuel-enriched gas stream or fuel-depleted gas stream may be recirculated to a gas turbine system coupled to a compressor and/or vacuum pump to capture the recirculation stream's energy. Another example is a fuel cell heat recovery system capable of transferring from the fuel cell to a heat recovery working fluid that can undergo expansion to power a gas turbine system.

A gas turbine system coupled to the PSA may power all compressors and vacuum pumps for the oxygen PSA, along with vacuum pump and/or heavy reflux compression for the hydrogen PSA. Such an auxiliary gas turbine cycle allows a heavy reflux vacuum pump and compressor to be driven by a turboexpander which expands the high temperature fuel cell anode exhaust gas, optionally with supplementary heating (or reheating between stages of expansion) by combustion of hydrogen PSA tail gas A feature of certain disclosed embodiments is integration of at least one vacuum pump and/or at least one compressor with a gas turbine powered directly or indirectly by tail gas combustion or indirectly by heat exchange to fuel cell stack waste heat. Thus, neither an electrical generator coupled to the thermal bottoming cycle nor an auxiliary power source is required to power any compressors and/or vacuum pumps for gas separation and/or supply systems. Such a gas turbine system may also be coupled to an auxiliary device such as an electrical current generator or a mechanical transmission to serve auxiliary power loads, e.g. fuel or water pumps, compressors, vacuum pumps, and rotation of PSA rotary adsorption modules as described hereunder. Either single or multiple spool gas turbine configurations may be considered. Centrifugal or axial machines may be used as the compressors and/or pumps. Approaches based on integration of gas turbines and fuel cells are particularly favorable for use in generation systems having larger power capacities. Free spool gas machinery (e.g. turbochargers) may be used in some economically preferred embodiments.

Thus, in the present system there are provided advanced high temperature fuel cell, in particular MCFC and SOFC, systems which may incorporate a pressure swing adsorption (PSA) and/or integrated gas turbine system to enrich hydrogen over the fuel cell anode while rapidly separating carbon dioxide (which may be supplied to the cathode for MCFC systems). In certain systems, the hydrogen PSA system may operate at high temperatures even approaching that of the high temperature fuel cell.

In one variant of the first or second embodiments described above, the electrical current generating system comprises a MCFC or SOFC fuel cell, an oxygen gas delivery system, and/or a hydrogen gas delivery system. The fuel cell can include an anode channel having an anode gas inlet for receiving a supply of hydrogen gas (or a fuel gas, such as natural gas or syngas, which reacts to form hydrogen in the anode channel), a cathode channel having a cathode gas inlet and a cathode gas outlet, and an electrolyte in communication with the anode and cathode channel for facilitating ion transport between the anode and cathode channels. The hydrogen gas delivery system may include a hydrogen PSA system, optionally including a rotary module having a stator and a rotor rotatable relative to the stator, for enriching hydrogen to the anode channel and extracting carbon dioxide therefrom. In some embodiments, the electrical current generating system also includes a PSA or VPSA system for enriching oxygen from air for supply to the cathode channel and/or to a fuel processing system. Such a PSA unit for enriching hydrogen and separating carbon dioxide will be referred to as a first PSA unit, while a second PSA or VPSA unit may be provided for oxygen enrichment.

The rotor of a rotary PSA unit suitable for use in the disclosed systems and processes preferably includes a number of flow paths for receiving adsorbent material therein for preferentially adsorbing a first gas component relative to a second gas component in response to increasing pressure in the flow paths. Such a pressure swing adsorption system also may include compression machinery coupled to the rotary module for facilitating gas flow through the flow paths for separating the first gas component from the second gas component. The stator preferably includes a first stator valve surface, a second stator valve surface, and plurality of function compartments opening into the stator valve surfaces. The function compartments preferably include at least a gas feed compartment, a light reflux exit compartment and a light reflux return compartment.

In some embodiments the hydrogen PSA system may itself operate at a high working temperature. For example, the operating temperature of the adsorbers in a first or hydrogen PSA unit may range from approximately ambient temperature to an elevated temperature up to about 450° C., as may be facilitated by recuperative or regenerative heat exchange between the first PSA unit and the fuel cell anode channel. According to another variation, the operating temperature of the adsorbers may range from about the operating temperature of an MCFC stack (e.g., about 600 to about 650° C.) or SOFC stack (e.g., about 500 to about 1000° C.) down to about 450° C., as may be facilitated by recuperative or regenerative heat exchange. In preferred embodiments, the operating temperature of the hydrogen PSA adsorbers may range from ambient to about 800° C., especially about 150° C. to about 800° C. for PSA units that contain catalysts and ambient to about 200° C. for PSA units that do not contain catalysts. Such a PSA unit may be configured to support a temperature gradient along the length of the flow channels, so that the temperature at the second end of the adsorbers is higher than the temperature at the first end of the adsorbers. As used herein, "operating temperature of the adsorbers" denotes the temperature of a gas flowing through the adsorbers and/or the temperature of the adsorber beds.

According to a third embodiment, there is disclosed an electrical current generating system that includes a MCFC or SOFC, and a H2 PSA coupled to the MCFC or SOFC, wherein the H2 PSA includes a first adsorbent and at least one second material selected from a second adsorbent and a steam reforming catalyst or water gas shift reaction catalyst. The first adsorbent is chemically distinct from the second adsorbent. For example, the adsorbent in the adsorbers of the first or hydrogen PSA may include a first zone of adsorbent, which is selective at an elevated operating temperature (e.g., about 250° C. to about 800° C.) for carbon dioxide in preference to water vapor. Suitable such adsorbents known in the art include alkali-promoted materials. Illustrative alkali-promoted materials include those containing cations of alkali metals such as Li, Na, K, Cs, Rb, and/or alkaline earth metals such as Ca, St, and Ba. The materials typically may be provided as the hydroxide, carbonate, bicarbonate, acetate, phosphate, nitrate or organic acid salt compound of the alkali or alkaline earth metals. Such compounds may be deposited on any suitable substrate such as alumina. Examples of specific materials include alumina impregnated with potassium carbonate and hydrotalcite promoted with potassium carbonate. For embodiments of the first PSA unit operating at temperatures closer to ambient, suitable adsorbents include alumina gel, activated carbons, hydrophilic zeolites (e.g. type 13X zeolite and many other zeolites known in the art), and hydrophobic zeolites (e.g. type Y zeolite or silicalite), among other adsorbent materials.

In high temperature embodiments of the first or hydrogen PSA unit, the adsorbent material in the same or another zone of the adsorbers may include a component catalytically active at the operating temperature of that zone for the steam reforming reaction (e.g. methane fuel or methanol fuel) and/or for the water gas shift reaction. The catalytically active component may be a reduced transition group metal or mixture of metals, or may be a transition group metal dispersed in zeolite cages and reversibly forming a metal carbonyl complex at the operating temperature of the second zone. Because carbon dioxide is preferentially adsorbed relative to steam, while enriched hydrogen is continually removed for introduction into the fuel cell anode channel, the concentrations of carbon dioxide and hydrogen over the catalytically active component may be maintained at a reduced level by the PSA process so as to shift the reaction equilibria favorably for the steam reforming and/or water gas shift reactions to proceed within the adsorbers of the first PSA unit. The conversion of carbon monoxide and reformable fuel components may be driven toward completion to generate carbon dioxide and additional hydrogen. This is an example of a PSA reactor or "sorption enhanced reactor", enhancing the simple gas separation effect to further generate enriched hydrogen while removing the carbon dioxide and driving the water gas shift reaction substantially to completion while achieving adequate purification of the hydrogen.

Industrial H2 PSA is normally conducted at considerably elevated pressures (>10 bars) to achieve simultaneous high purity and high recovery (~80%–85%). Fuel cell systems operating with pressurized methanol reformers or in integration with gas turbine cycles may operate at relatively high pressures. Molten carbonate fuel cells operate at pressures from atmospheric up to about at most 10 bars, with lower pressures strongly preferred at present as required to achieve extended stack life. Solid oxide fuel cells may be designed to operate at any pressure. In the high temperature fuel cell power plants of the present system, working pressures of about 5–20 bars are preferred.

The pressure of the light product gas exiting from the hydrogen PSA and oxygen PSA systems in the above discussed embodiments of the present system may vary widely. Compressors or other pressure-increasing mechanisms may be employed to boost the light product gas pressure if necessary prior to introduction into the fuel cell. At very low feed pressures (e.g., 2–3 bars), the first PSA may utilize supplemental compression to achieve higher recovery of hydrogen and simultaneously higher concentration of carbon dioxide. Alternative approaches may include vacuum pumping to widen the working pressure ratio, or alternatively "heavy reflux" which involves recompression and recycle to the PSA feed of a fraction of its exhaust stream at full pressure. Such vacuum and heavy reflux options may be combined by using an oversized vacuum pump.

In certain embodiments, heavy reflux enables the first PSA to achieve enhanced hydrogen recovery, thus improving fuel utilization by the high temperature fuel cell while also enhancing the concentration of carbon dioxide in the first PSA exhaust stream. At given conditions of working pressure and temperature, hydrogen recovery may be increased by increasing the heavy reflux flow, with the penalty of a corresponding increase in heavy reflux compression power demand. Contrary to the generally accepted view that hydrogen PSA requires a high feed pressure for satisfactory operation, hydrogen PSA with heavy reflux can achieve high hydrogen recovery while operating with a pressure ratio as low as 2:1 between the higher and lower working pressures of the PSA cycle. The larger flow needed for heavy reflux at such a low working pressure ratio is offset by the much lower pressure to which the feed and heavy reflux streams must be compressed.

Also disclosed are embodiments in which the first PSA unit is provided as a two stage PSA module as described in co-pending U.S. patent application Ser. No. 09/998,443 "Multistage System for Separating Gas by Adsorption", the complete disclosure of which is included herein by reference. The two stage hydrogen PSA unit includes a hydrogen enrichment stage cooperating with a carbon dioxide enrichment stage. For given hydrogen purity and recovery, heavy reflux flow and associated compression power consumption may be usefully reduced with the two stage hydrogen PSA, especially when the feed hydrogen concentration is relatively high.

The systems and processes of the above-disclosed embodiments of the present disclosure can improve overall efficiency of high temperature fuel cell systems to reduce the proportionate amount of carbon dioxide formed, while enabling delivery as and when desired of that carbon dioxide in highly concentrated form for most convenient sequestration from the atmosphere, including for example by underground disposal in depleted natural gas reservoirs or for enhanced oil recovery from petroleum reservoirs. In addition, exported power may be delivered only from the fuel cell stack, thus there is no export of power from a thermal bottoming cycle, or generators and associated gear boxes on the thermal bottoming turbines which are thus reduced to simple turbochargers. Instead, according to certain embodiments, the system may be adapted to utilize high grade waste heat from the fuel cell stack to drive free rotor turbochargers as required for feed air compression, vacuum pumping of exhausted nitrogen-enriched air, and heavy reflux compression of carbon dioxide enriched anode tail gas; with the fuel cell stack waste heat matched to these auxiliary loads so as to facilitate operation at high current density.

The fuel cell stack in the power plant systems of the present disclosure can run at relatively high current density (e.g., about 200 to about 1000 $mA/cm^2$) to generate the required amount of waste heat for the auxiliary compression loads, since the incorporation of the disclosed PSA systems are found to be effective to raise open circuit voltages (e.g., from about 0.75 to about 0.95 volts). The necessary fuel cell stack size per kW of generating capacity can be reduced by operating at relatively high current density, as may be facilitated by the presently disclosed system. Equivalently, the same size fuel cell stack in an embodiment of the present system can achieve the full power output formerly achieved by a similar conventional stack plus conventional thermal bottoming generator, which can be eliminated in certain disclosed embodiments.

The power plant of the present system is particularly suitably applied to high temperature fuel cell power plants (MCFC or SOFC) using a hydrocarbon fuel such as natural gas as a fuel source. Prior to being admitted to the fuel cell anode channel inlet, the fuel may be mixed with hydrogen rich gas separated by a first PSA unit from the anode exhaust gas. In such a case, the PSA separation may be performed after the anode exhaust gas has been subjected to post-reforming and water gas shift reaction steps so as to elevate the hydrogen concentration therein while oxidizing carbon monoxide to carbon dioxide.

In a preferred embodiment of the present system wherein natural gas is utilized as the hydrocarbon fuel, the anode feed gas preferably comprises a mixture including methane and a large excess of recycled hydrogen. The excess hydrogen inhibits soot deposition by the methane cracking reaction, thus allowing safe operation of the fuel cell with a minimum amount of steam in the anode feed gas. The amount of steam in the anode feed gas may be reduced to substantially zero if the recycle hydrogen concentration is maintained at a high level (e.g. about 85–90% of the anode feed gas). Benefits of reducing steam concentration in the anode feed gas include:

1. higher initial ratio of $H_2$ to $H_2O$ elevates the Nernst potential to improve voltage efficiency and output.
2. methane acts as a chemical sink for fuel cell reaction $H_2O$ by steam reforming, thus helping maintain a higher ratio of $H_2$ to $H_2O$ along the anode channel.
3. methane conversion to CO and $H_2$ is delayed along the anode channel as $H_2O$ is supplied by the fuel cell oxidation reaction, thus alleviating steep temperature gradients that would result from overly rapid endothermic steam reforming at the anode entrance.
4. low steam concentration inhibits conversion of $CH_4$ and CO to $CO_2$, thus ensuring that the steam reforming reaction within the anode channel is most highly endothermic to take up fuel cell waste heat for improved overall heat balance.

By contrast, prior art internally reforming MCFC or SOFC fuel cells typically operate with a substantial steam/carbon ratio in the anode feed gas to suppress carbon deposition, thus depressing fuel cell voltage performance. This prior art approach typically requires pre-reforming of a substantial fraction of the fuel natural gas to avoid excessive cooling at the anode entrance and steep temperature gradients, that would result from overly rapid endothermic steam reforming as the fuel enters the anode channel.

The anode exhaust gas typically contains some unreacted methane as well as a considerable fraction of carbon monoxide. In some embodiments of the present system it is provided that steam may be added to the anode exhaust gas which may then be admitted at elevated temperature to an adiabatic post-reformer, simultaneously performing the endothermic steam reforming reaction with the exothermic water gas shift reaction so that external heat exchange for the post-reformer is not needed. In such and embodiment, the post-reformer includes a reactor chamber containing a catalyst active for the steam methane reforming reaction In some preferred embodiments of the present system, the anode gases may be used as the working fluid for a thermal bottoming cycle for recovering fuel cell stack waste heat at least in part to power any PSA unit(s) and associated gas compression loads for anode gas separation and/or cathode oxygen enrichment. The steam added upstream of the post-reformer also contributes to the working fluid, desirably increasing the average molecular weight of the hydrogen-rich anode gas stream. After being processed by the post-reformer, the working fluid (post-reformed anode gases with supplementary steam) may be expanded in a first turbine.

Further expansion of the working fluid may be conducted in a second turbine, desirably after reheat by heat exchange with a combustor which may be fueled with exhaust gas from the first (hydrogen) PSA unit. The working fluid is then recuperatively cooled, and may be circulated through a water gas shift reactor to convert carbon monoxide and steam to hydrogen and carbon dioxide. After further recuperative cooling and water condensate knock-out, the working fluid (anode gases after post-reforming, water gas shift and water removal) may be compressed as feed to the first PSA unit. The first PSA unit is operable to deliver a light product of compressed hydrogen enriched gas to be recuperatively heated and mixed with incoming natural gas (or other hydrocarbon) fuel as the fuel mixture fed to the anode entrance.

The first PSA unit in the inventive embodiment described above is also operative to deliver a heavy product of $CO_2$ enriched gas which may be passed through a combustor for removal of residual hydrogen and other combustible fuel values, and then may be exhausted from the power plant after heat recovery. The oxidant used in the combustor may be air, or preferably either enriched oxygen from a second air separation PSA unit supplying enriched oxygen to the fuel cell cathode, or more preferably cathode exhaust gas still containing unreacted oxygen and delivered from the cathode exhaust at elevated temperature so as to contribute to heat recovery from the combustor.

As the first PSA unit delivers enriched hydrogen as its light product, and may be operated to deliver highly purified hydrogen, according to a preferred embodiment of the present system it is provided that the power plant may operate in a cogeneration mode to deliver (1) electrical power, (2) purified hydrogen, and (3) low grade heat. The present disclosure achieves integration of the fuel processing system with the high temperature fuel cell in a most favorable way to achieve increased voltage efficiency and increased overall efficiency of the power plant in its electrical power generating mode, while optionally also producing co-product or byproduct fuel-grade hydrogen with high efficiency. The power plant may be operated so as to preferably generate electricity and/or fuel-grade hydrogen according to demand of those respective products.

A further feature of the system in such hydrogen cogeneration embodiments is to compress the delivered hydrogen for storage or for delivery as compressed hydrogen fuel (e.g. for vehicles). The hydrogen product compressor may be powered electrically, e.g. by the fuel cell. Alternatively, the hydrogen product compressor may be powered by the heat engine recovering power plant waste heat, or by a combustion engine fueled by exhaust gas from the first PSA unit purifying the hydrogen, or by a combustion engine fueled by any external fuel source, or by a combination of energy sources within the power plant. Storage of cogenerated hydrogen may be achieved herein by any of the techniques known in the art, including high pressure gas compression, cryogenic liquefaction, sorption on metal hydrides, low temperature sorption on physical adsorbents, etc.

Yet another optional feature of the system is to use some or all of the cogenerated and stored hydrogen as fuel for a low temperature fuel cell (such as a polymer electrolyte membrane or PEM fuel cell) cooperating with the high temperature fuel cell. The low temperature fuel cell may usefully provide enhanced power delivery capability for rapid start-up and load following responsiveness. If the hydrogen PSA of the present system uses a CO-selective adsorbent so as to achieve effective removal of carbon monoxide from the cogenerated hydrogen as required to protect a PEM fuel cell from CO poisoning, the required hydrogen purity may be relaxed with respect to other impurities such as nitrogen and carbon monoxide.

The use of internal reforming SOFC fuel cells to cogenerate electrical power and hydrogen (with the hydrogen either to be exported or to be used by a cooperating PEM fuel cell) has been proposed previously. The present system here provides major enhancements through the recovery and application of excess heat from the SOFC (and any fuel value of PSA tail gas) through an auxiliary heat engine cycle to power compression for hydrogen enrichment or purification by PSA, the hydrogen being recycled to enhance SOFC performance and with excess hydrogen here provided for export, storage, or operation of a cooperating PEM fuel cell.

In some preferred embodiments, fuel cell heat recovery may be performed by a gas turbine cycle using gas from the anode recycle loop as a working fluid. The gas turbine cycle may be realized by free rotor turbocompressors recovering fuel cell stack heat to perform gas compression loads for the PSA unit(s).

In other embodiments, fuel cell heat recovery may be performed by other types of heat engine using air, cathode gases, anode gases, steam or hydrogen as thermodynamic working fluid. In each case, the heat engine powers gas compression required for operation of the hydrogen PSA and optionally an oxygen PSA to enhance fuel cell performance.

Since a first PSA unit may be operated to generate purified hydrogen to be recycled to the anode inlet, as well as optionally for delivery as a co-product of the power plant, hydrogen may advantageously be used as the working fluid for a Stirling engine for recovery of fuel cell heat. The engine may directly power gas compression for the PSA unit(s), and optionally also compression of hydrogen to be stored or exported from the plant.

As certain types of SOFC (e.g. monolithic or microtubular configurations) are being developed to achieve high power density, as well as improved responsiveness and durability under starting and load-following duty conditions, opportunities are emerging for application of advanced SOFC technology to vehicular applications. The present system enhances the potential for application of SOFC power plants for vehicle propulsion, especially in the context of SOFC hybrid vehicles with electric motor propulsion drives. Some form of heat recovery engine is required if a SOFC power plant is to achieve highest possible efficiency. The present system applies the heat recovery engine to drive compression loads for auxiliary PSA to augment SOFC performance and efficiency for powering the primary electric loads, thus avoiding complexity that would arise with the heat recovery engine as a separate propulsion prime mover. This aspect of the system applies most generally to any type of vehicle, including highway, off-road, marine and aviation applications.

The system thus includes SOFC hybrid vehicles in which an SOFC power plant according to the system delivers electrical power for propulsion and auxiliary loads, with electric storage batteries (and/or ultracapacitors) providing power during SOFC warm-up starting transients, load following peak power and regenerative braking. The vehicle fuel may be any hydrocarbon compound or mixture suitable for steam reforming at substantially the working temperature of the fuel cell. Suitable fuels include natural gas, propane, Fischer-Tropsch gasoline, methanol, and dimethyl ether. With sufficient electric battery capacity provided, the hybrid concept accommodates the warm-up time needed by the SOFC, and allows the high cost SOFC to be sized for average rather than maximum power demand. The present system enhances the hybrid concept by recovering high grade SOFC heat to augment SOFC performance (either to improve efficiency and range, or to further reduce the necessary size of the SOFC stack by increasing its power density), while maintaining a simple all electric propulsion drive.

As the present system enables the SOFC power plant to cogenerate hydrogen which may be directed to a PEM fuel cell, the system further includes SOFC hybrid vehicle embodiments with on-board hydrogen compression and storage, and SOFC/PEM hybrid vehicle embodiments in which hydrogen generated by the SOFC power plant may be supplied to a cooperating PEM fuel cell which contributes power towards starting and load-following transients, so that the required size and weight of the electric storage battery may be reduced. Either or both of the electrical and hydrogen cogeneration energy outputs of the SOFC power plant may thus be directed to storage means for electrical energy or hydrogen, for great flexibility in a diverse range of applications.

The foregoing features and advantages will become more apparent from the following detailed description of several embodiments that proceeds with reference to the accompanying figures.

BRIEF DESCRIPTION OF THE DRAWINGS

Certain embodiments are described below with reference to the following figures.

DETAILED DESCRIPTION OF SEVERAL EMBODIMENTS

FIGS. 1–5

An exemplary oxygen-enrichment rotary PSA module for application in several embodiments of the system is described below in connection with FIGS. 1–5B, but it is understood that the same or similar rotary PSA module configuration could be used for hydrogen enrichment (i.e., separation) in the disclosed electrical current generating systems. As used herein, a "rotary PSA" includes, but is not limited to, a PSA wherein an array of adsorbers rotates relative to a fixed valve face or stator or a PSA wherein the valve face or stator rotates relative to an array of adsorbers.

Figure 1:
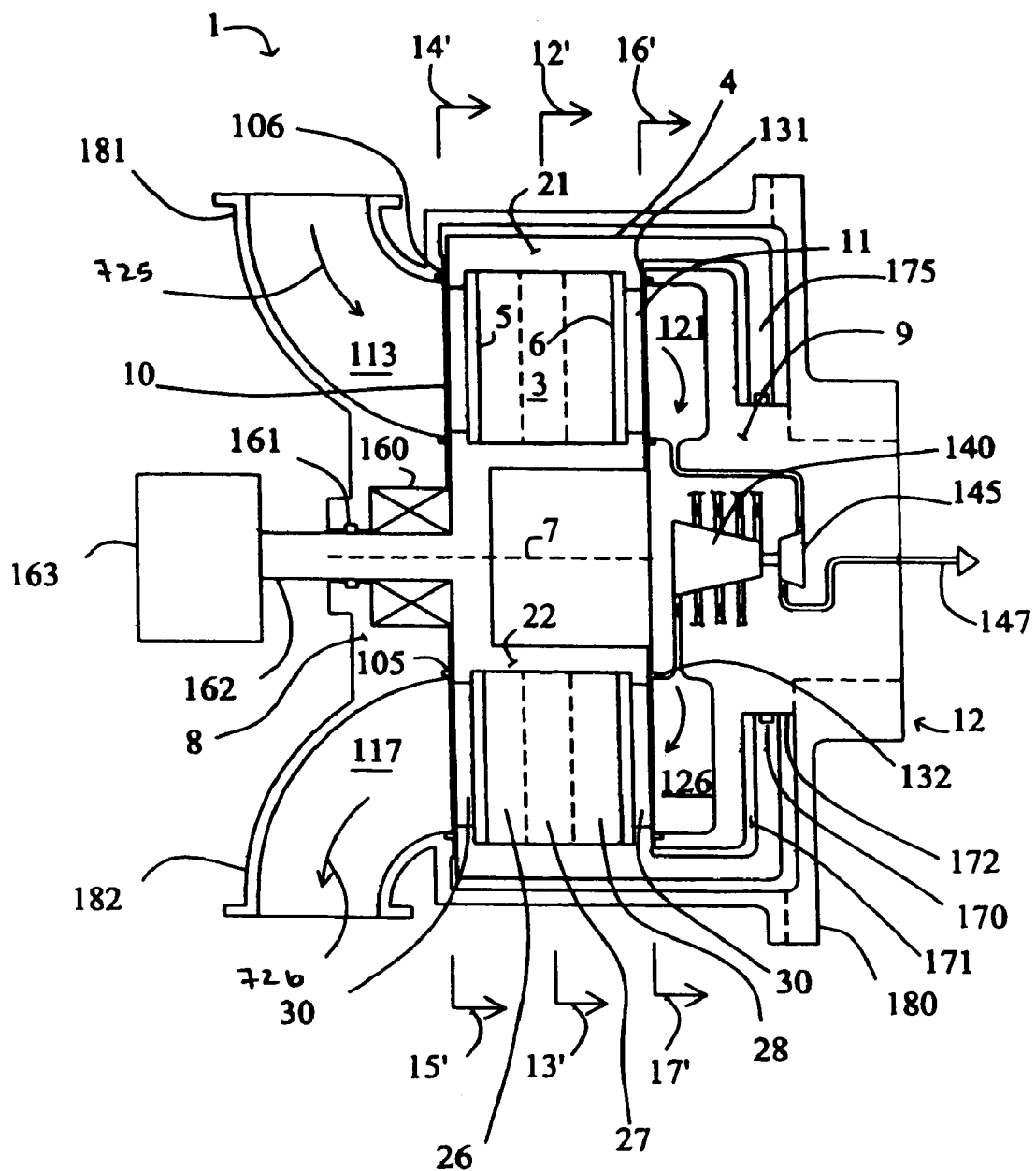
FIG. 1 shows an axial section of a rotary PSA module.

FIG. 1 shows a rotary PSA module 1, which includes a number "N" of adsorbers 3 in adsorber housing body 4. Each adsorber has a first end 5 and a second end 6, with a flow path therebetween contacting a nitrogen-selective adsorbent (for oxygen enrichment). The adsorbers are deployed in an axisymmetric array about axis 7 of the adsorber housing body. The housing body 4 is in relative rotary motion about axis 7 with first and second functional bodies 8 and 9, being engaged across a first valve face 10 with the first functional body 8 to which feed gas mixture is supplied and from which the heavy product is withdrawn, and across a second valve face 11 with the second functional body 9 from which the light product is withdrawn.

In exemplary rotary PSA embodiments as particularly depicted in FIGS. 1–5, the adsorber housing 4 rotates and shall henceforth be referred to as the adsorber rotor 4, while the first and second functional bodies are stationary and together constitute a stator assembly 12 of the module. The first functional body shall henceforth be referred to as the first valve stator 8, and the second functional body shall henceforth be referred to as the second valve stator 9. In other embodiments, the adsorber housing 4 may be stationary, while the first and second functional bodies may be rotary distributor valve rotors.

In the exemplary embodiment shown in FIGS. 1–5, the flow path through the adsorbers is parallel to axis 7, so that the flow direction is axial, while the first and second valve faces are shown as flat annular discs normal to axis 7. However, more generally the flow direction in the adsorbers may be axial or radial, and the first and second valve faces may be any figure of revolution centred on axis 7. The steps of the process and the functional compartments to be defined will be in the same angular relationship regardless of a radial or axial flow direction in the adsorbers.

FIGS. 2–5 are cross-sections of module 1 in the planes defined by arrows 12'–13', 14'–15', and 16'–17'. Arrow 20 in each section shows the direction of rotation of the rotor 4.

Figure 2:
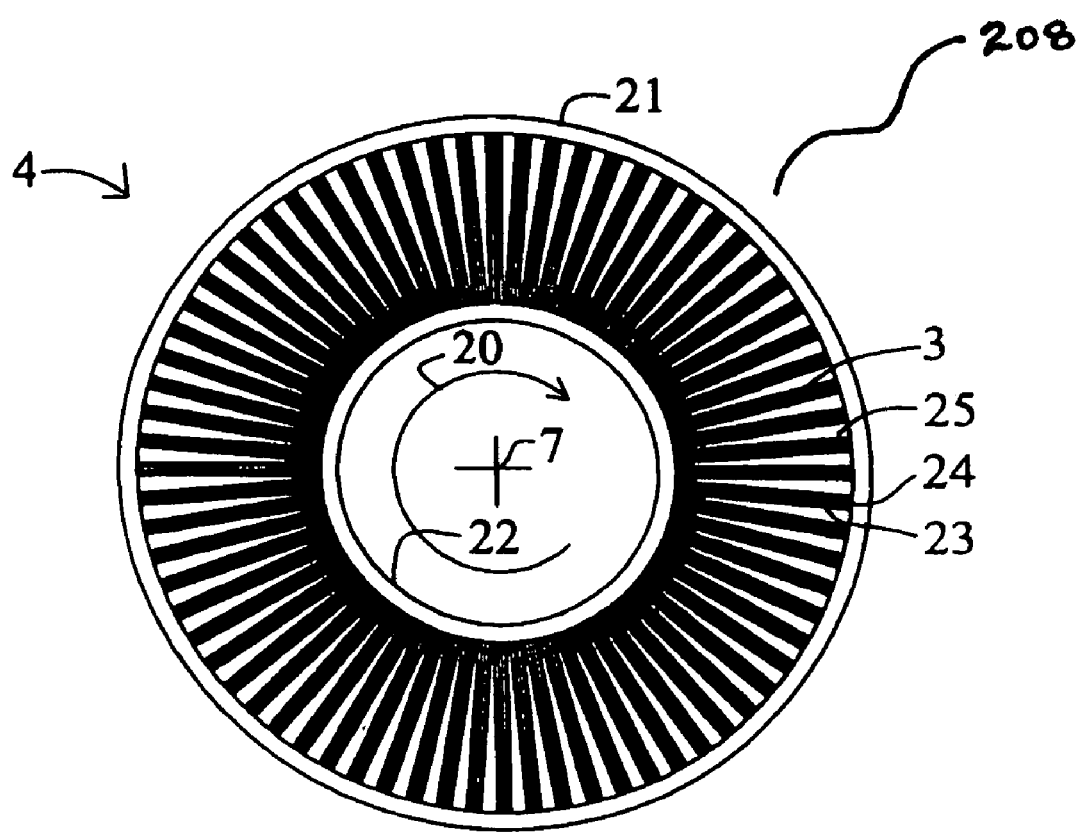
FIGS. 2 through 5B show transverse sections of the module of FIG. 1.

FIG. 2 shows section 12'–13' across FIG. 1, which crosses the adsorber rotor. Here, "N"=72. The adsorbers 3 are mounted between outer wall 21 and inner wall 22 of adsorber wheel 208. Each adsorber comprises a rectangular flat pack 3 of adsorbent sheets 23, with spacers 24 between the sheets to define flow channels here in the axial direction. Separators 25 are provided between the adsorbers to fill void space and prevent leakage between the adsorbers. Alternatively, adsorbers may comprise other arrangements of adsorbent material, including but not limited to conventional beaded or extruded adsorbents, or laminated adsorbent sheets in spirally rolled or other conformations.

As shown in FIG. 1, the adsorbers 3 may include a plurality of distinct zones between the first end 5 and the second end 6 of the flow channels, here shown as three zones respectively a first zone 26 adjacent the first end 5, a second zone 27 in the middle of the adsorbers, and a third zone 28 adjacent the second end 6. As an alternative to distinct zones of adsorbents, the different adsorbents may be provided in layers or mixtures that include varying gradients of adsorbent concentrations along the gas flow path. The transition from one adsorbent to another may also be a blended mixture of the two adsorbents rather than a distinct transition. A further option is to provide a mixture of the different adsorbents that may or may not be homogeneous.

In the case of a $H_2$ PSA operating at ambient temperature up to about 250° C., a first zone may contain an adsorbent or desiccant selected for removing very strongly adsorbed components of the feed gas mixture, such as water or methanol vapor, and some carbon dioxide. A second zone may contain an adsorbent typically selected for bulk separation of impurities (e.g. carbon dioxide) at relatively high concentration, and a third zone may contain an adsorbent typically selected for polishing removal of impurities at relatively low concentration.

In the case of a $H_2$ PSA operating at about 250° C. to about 800° C., a first zone may contain an adsorbent that preferentially adsorbs $CO_2$ relative to water vapor as described above. A second zone may contain an adsorbent (e.g., zeolite, Cu(I)-containing material, or Ag(I)-containing material) that preferentially adsorbs CO relative to water vapor. A third zone may contain a desiccant for removing water vapor such as alumina gel. According to one version, the $CO_2$-selective adsorbent and the CO-selective adsorbent may be included or mixed together in a single zone rather than in two distinct zones.

In embodiments of the system incorporating catalytic materials in the PSA module, the reforming and/or water gas shift reaction catalyst(s) described in summary above may be included in any part of the adsorber bed, but preferably are included in the section prior to removal of the water vapor since water vapor is a reactant for the reforming and water gas shift reactions. In the temperature range of about 600° C. to about 1000° C., nickel supported on alumina is an effective catalyst for steam reforming of methane and the water gas shift reaction. In the temperature range of about 350° C. to about 600° C., iron/chromia catalysts are effective for the water gas shift reaction. In the temperature range of about 200° C. to about 300° C., copper/zinc oxide catalysts are effective for the water gas shift reaction. Other water gas shift catalysts known in the art include noble metals, and/or transition metals, and/or ceria.

In those embodiments in which the $H_2$ PSA is performing the exothermic water gas shift reaction, any excess heat may be removed from the PSA by providing, for example, heat exchange means in a wall of the PSA or in the adsorber beds. In those embodiments in which the $H_2$ PSA is performing the endothermic reforming reaction, any required additional heat may be delivered to the PSA by providing, for example, heat exchange means in a wall of the PSA or in the adsorber beds or by integrating a burner with the PSA.

In embodiments of the present system incorporating adsorbent sheet type adsorbers in a PSA, the adsorbent sheets preferably comprise a reinforcement material (e.g., glass fibre, metal foil or wire mesh) to which the adsorbent material is attached with a suitable binder. For air separation to produce enriched oxygen, alumina gel may be used in a first zone to remove water vapor, while typical nitrogen-effective adsorbents which may be incorporated in second and third zones include X, A or chabazite type zeolites, preferably exchanged with lithium, calcium, strontium, magnesium and/or other cations, and with optimized silicon/aluminium ratios as well known in the art. The zeolite crystals may be bound with silica, clay and other binders, or self-bound, within the adsorbent sheet matrix. The nitrogen-selective zeolite adsorbents tend to be effective in the temperature range from ambient up to about 100° C.

Satisfactory adsorbent sheets have been made by coating a slurry of zeolite crystals with binder constituents onto the reinforcement material, with successful examples including nonwoven fibreglass scrims, woven metal fabrics, and expanded aluminium foils. Spacers may be provided by printing or embossing the adsorbent sheet with a raised pattern, or by placing a fabricated spacer between adjacent pairs of adsorbent sheets. Alternative satisfactory spacers have been provided as woven and expanded metal screens, non-woven fibreglass scrims, and metal foils with etched flow channels in a photolithographic pattern. Adsorbers of the layered adsorbent sheet material may be formed by stacking flat or curved sheets; or by forming a spiral roll, with the flow channels between the sheets extending from the first end of the adsorber to the second end thereof; to fill the volume of the adsorber housing of the desired shape. Examples of methods and structures with packed, spirally wound adsorbents are disclosed in commonly-owned, co-pending U.S. Provisional Application No. 60/285,527, filed Apr. 20, 2001, and incorporated herein by reference.

Suitable experimental adsorbent sheets have been produced with thicknesses of about 150 microns, with spacer heights in the range of 100 to 150 microns, and adsorbent flow channel lengths of approximately 20 cm. Using X type zeolites, excellent performance has been achieved in oxygen separation from air at PSA cycle frequencies in the range of 1 to at least 150 cycles per minute, preferably at least about 25 cycles per minute.

Figure 3:
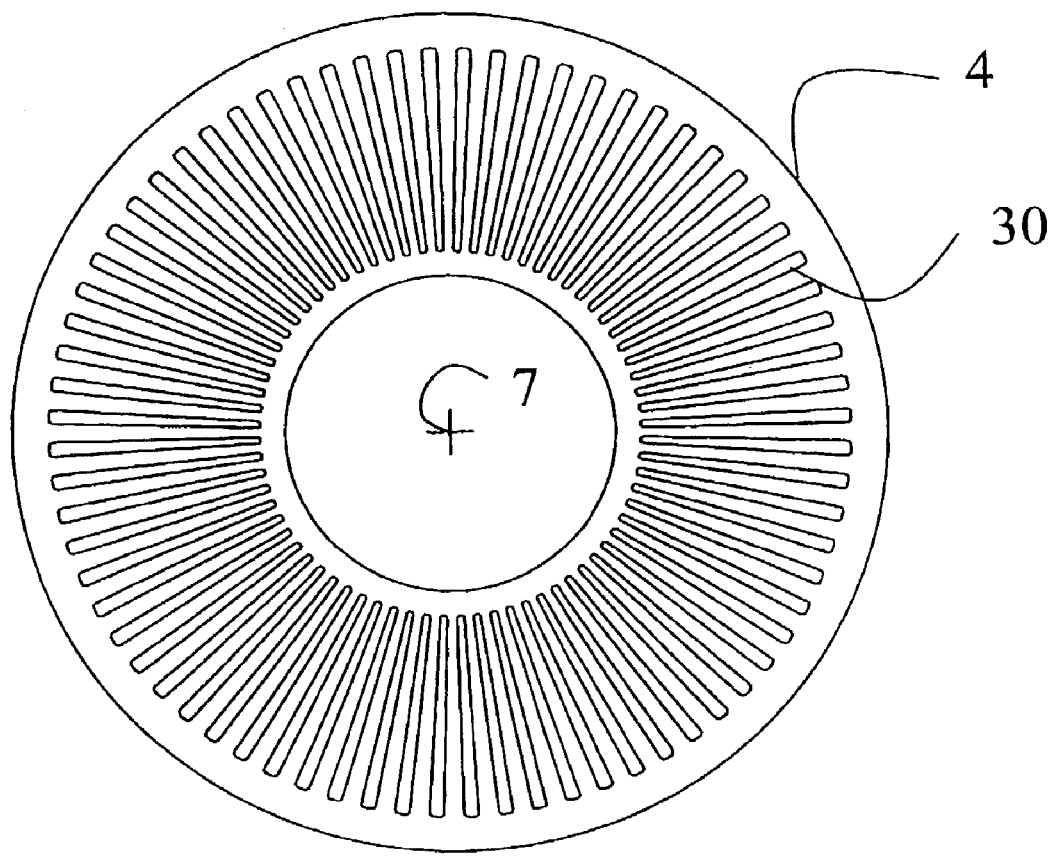

FIG. 3 shows the exemplary porting of rotor 4 in the first and second valve faces respectively in the planes defined by arrows 14'–15', and 16'–17'. An adsorber port 30 provides fluid communication directly from the first or second end of each adsorber to respectively the first or second valve face.

Figure 4A:
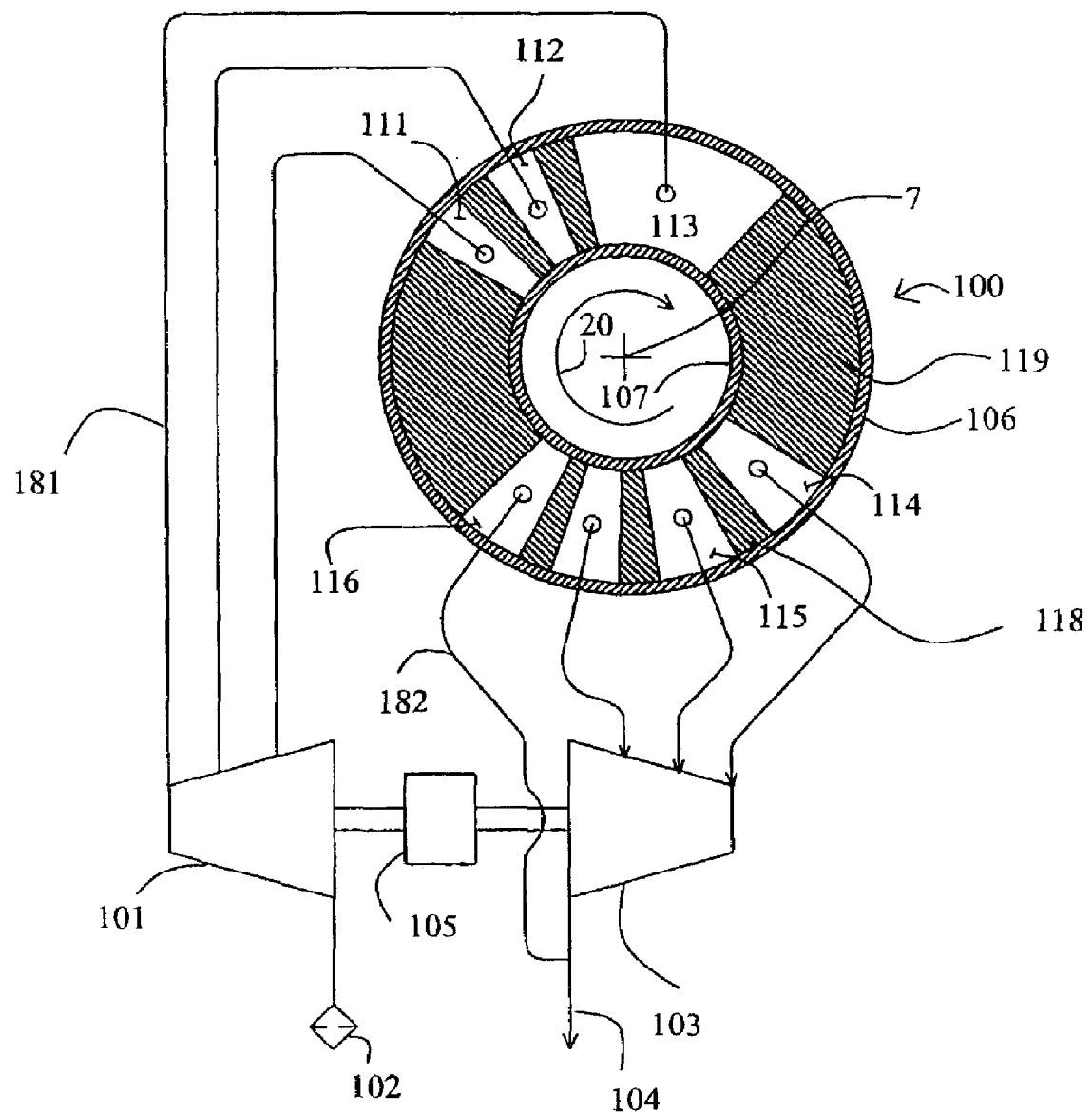
Figure 4B:
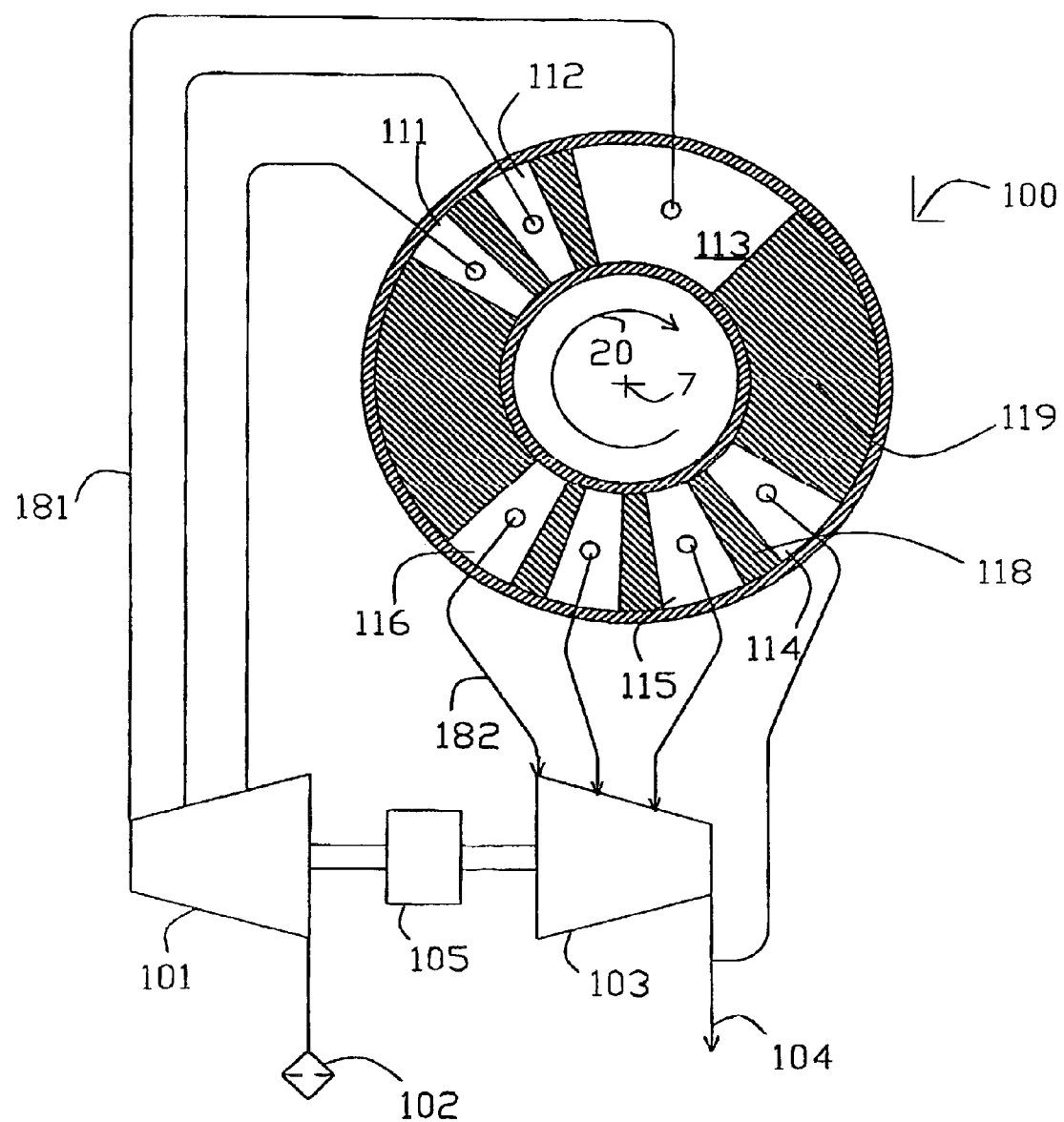

FIGS. 4A and 4B show the first stator valve face 100 of the first stator 8 in the first valve face 10, in the plane defined by arrows 14'–15'. Fluid connections are shown to a feed compressor 101 inducting feed air from inlet filter 102, and to an exhauster 103 delivering nitrogen-enriched second product to a second product delivery conduit 104. Compressor 101 and exhauster 103 are shown coupled to a drive motor 105.

Arrow 20 indicates the direction of rotation by the adsorber rotor. In the annular valve face between circumferential seals 106 and 107, the open area of first stator valve face 100 ported to the feed and exhaust compartments is indicated by clear angular segments 111–116 corresponding to the first functional ports communicating directly to functional compartments identified by the same reference numerals 111–116. The substantially closed area of valve face 100 between functional compartments is indicated by hatched sectors 118 and 119, which are slippers with, zero clearance, or preferably a narrow clearance to reduce friction and wear without excessive leakage. Exemplary closed sector 118 provides a transition for an adsorber, between being open to compartment 114 and open to compartment 115. A gradual opening may be provided by a tapering clearance channel between the slipper and the sealing face, so as to achieve gentle pressure equalization of an adsorber being opened to a new compartment. Much wider closed sectors (e.g. 119) are provided to substantially close flow to or from one end of the adsorbers when pressurization or blowdown is being performed from the other end.

The feed compressor provides feed gas to exemplary feed pressurization compartments 111 and 112, and to feed production compartment 113. Compartments 111 and 112 have successively increasing working pressures, while compartment 113 is at the higher working pressure of the PSA cycle. Compressor 101 may thus be a multistage or split stream compressor system delivering the appropriate volume of feed flow to each compartment so as to achieve the pressurization of adsorbers through the intermediate pressure levels of compartments 111 and 112, and then the final pressurization and production through compartment 113. A split stream compressor system may be provided in series as a multistage compressor with interstage delivery ports; or as a plurality of compressors in parallel, each delivering feed gas to the working pressure of a compartment 111 to 113. Alternatively, compressor 101 may deliver all the feed gas to the higher pressure, with throttling of some of that gas to supply feed pressurization compartments 111 and 112 at their respective intermediate pressures.

Similarly, exhauster 103 exhausts heavy product gas from countercurrent blowdown compartments 114 and 115 at the successively decreasing working pressures of those compartments, and finally from exhaust compartment 116 which is at the lower pressure of the cycle. Similarly to compressor 101, exhauster 103 may be provided as a multistage or split stream machine, with stages in series or in parallel to accept each flow at the appropriate intermediate pressure descending to the lower pressure.

In the examplary embodiment of FIG. 4A, the lower pressure is ambient pressure, so exhaust compartment 116 is shown to exhaust directly to heavy product delivery conduit 104. Exhauster 103 thus provides pressure letdown with energy recovery to assist motor 105 from the countercurrrent blowdown compartments 114 and 115. For simplicity, exhauster 103 may be replaced by throttling orifices as countercurrent blowdown pressure letdown means from compartments 114 and 115. Alternatively, other types of pressure letdown means may be used.

In some embodiments, the lower pressure of the PSA cycle is subatmospheric. Exhauster 103 is then provided as a vacuum pump, as shown in FIG. 4B. Again, the vacuum pump may be multistage or split stream, with separate stages in series or in parallel, to accept countercurrent blowdown streams exiting their compartments at working pressures greater than the lower pressure which is the deepest vacuum pressure. In FIG. 4B, the early countercurrent blowdown stream from compartment 114 is released at ambient pressure directly to heavy product delivery conduit 104. If for simplicity a single stage vacuum pump were used, the countercurrent blowdown stream from compartment 115 would be throttled down to the lower pressure over an orifice to join the stream from compartment 116 at the inlet of the vacuum pump. A vacuum pump can allow the PSA to operate at lower pressures that may be advantageous when the PSA is coupled to a fuel cell operating at lower pressures such as a MCFC operating at ambient pressure. Vacuum PSA operation favors high oxygen yield or fractional recovery, and hence high-energy efficiency, in air separation.

Figure 5A:
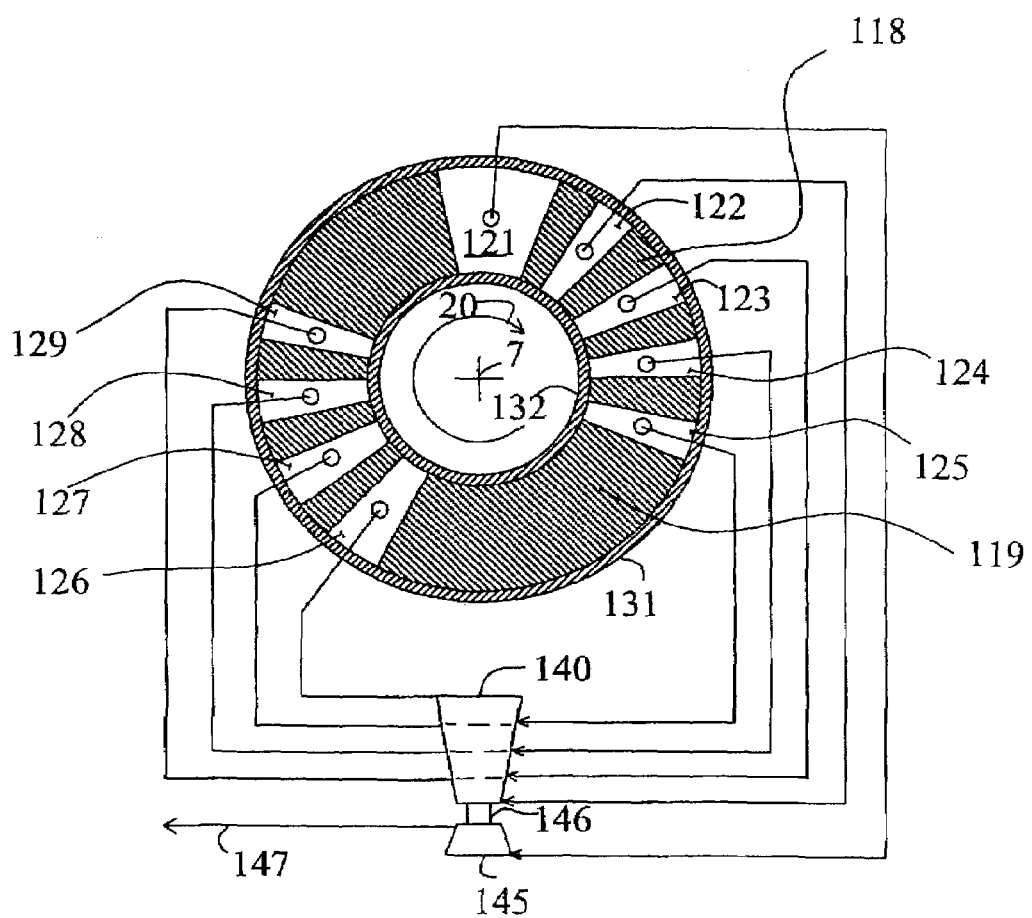
Figure 5B:
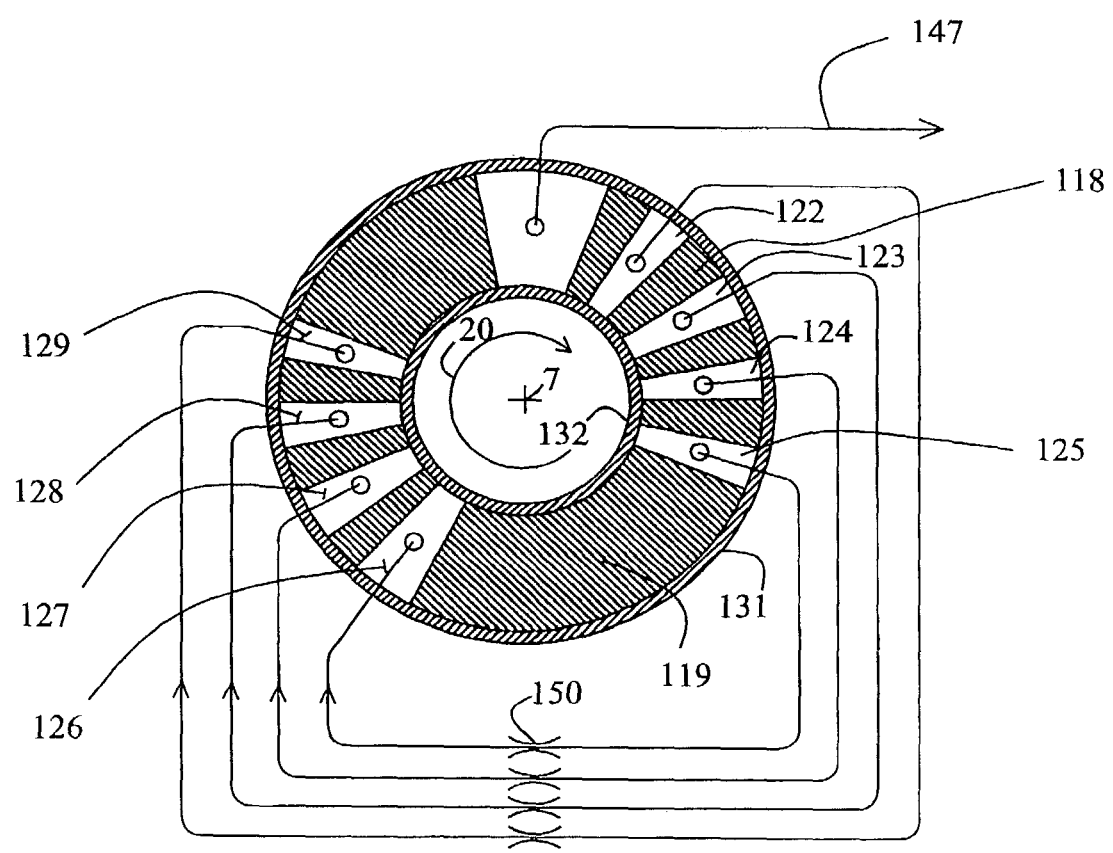

FIGS. 5A and 5B shows an exemplary second stator valve face, at section 16'–17' of FIG. 1. Open ports of the valve face are second valve function ports communicating directly to a light product delivery compartment 121; a number of light reflux exit compartments 122, 123, 124 and 125; and the same number of light reflux return compartments 126, 127, 128 and 129 within the second stator. The second valve function ports are shown in the annular ring defined by circumferential seals 131 and 132. Each pair of light reflux exit and return compartments provides a stage of light reflux pressure letdown, respectively for the PSA process functions of supply to backfill, full or partial pressure equalization, and cocurrent blowdown to purge.

Illustrating the option of light reflux pressure letdown with energy recovery, a split stream light reflux expander 140 is shown in FIGS. 1 and 5A to provide pressure let-down of four light reflux stages with energy recovery. The light reflux expander provides pressure let-down for each of four light reflux stages, respectively between light reflux exit and return compartments 122 and 129, 123 and 128, 124 and 127, and 125 and 126 as illustrated. The light reflux expander 140 may power a light product booster compressor 145 by drive shaft 146, which delivers the oxygen enriched light product to oxygen delivery conduit 147 and compressed to a delivery pressure above the higher pressure of the PSA cycle. Illustrating the option of light reflux pressure letdown with energy recovery, a split stream light reflux expander 140 is provided to provide pressure letdown of four light reflux stages with energy recovery. The light reflux expander serves as pressure let-down means for each of four light reflux stages, respectively between light reflux exit and return compartments 122 and 129, 123 and 128, 124 and 127, and 125 and 126 as illustrated.

Since the light reflux and light product have approximately the same purity, expander 140 and light product compressor 145 may be hermetically enclosed in a single housing which may conveniently be integrated with the second stator as shown in FIG. 1. This configuration of a "turbocompressor" booster without a separate drive motor is advantageous, as a useful pressure boost can be achieved without an external motor and corresponding shaft seals, and can also be very compact when designed to operate at high shaft speeds.

FIG. 5B shows the simpler alternative of using a throttle orifice 150 as the pressure letdown means for each of the light reflux stages.

Turning back to FIG. 1, compressed feed gas is supplied to compartment 113 as indicated by arrow 725, while heavy product is exhausted from compartment 117 as indicated by arrow 726. The rotor is supported by bearing 160 with shaft seal 161 on rotor drive shaft 162 in the first stator 8, which is integrally assembled with the first and second valve stators. The adsorber rotor is driven by motor 163 as rotor drive means.

A buffer seal 170 is provided to provide more positive sealing of a buffer chamber 171 between seals 131 and 171. In order to further minimize leakage and to reduce seal frictional torque, buffer seal 171 seals on a sealing face 172 at a much smaller diameter than the diameter of circumferential seal 131. Buffer seal 170 seals between a rotor extension 175 of adsorber rotor 4 and the sealing face 172 on the second valve stator 9, with rotor extension 175 enveloping the rear portion of second valve stator 9 to form buffer chamber 171. A stator-housing member 180 is provided as structural connection between first valve stator 8 and second valve stator 9. Direct porting of adsorbers to the stator face is an alternative to providing such seals and is described in commonly-owned, co-pending U.S. Provisional Application No. 60/301,723, filed Jun. 28, 2001, and incorporated herein by reference.

In the following system figures of this disclosure, simplified diagrams will represent a PSA apparatus or module. These highly simplified diagrams will indicate just a single feed conduit 181 to, and a single heavy product conduit 182 from, the first valve face 10; and the light product delivery conduit 147 and a single representative light reflux stage with pressure let-down means communicating to the second valve face 11.

Copending patent application "Energy Efficient Gas Separation for Fuel Cells" of 21 Oct. 2001 discloses various energy recovery systems using different heat recovery working fluids, any of which may be incorporated herewith. In one variant, the oxygen PSA compressor is integrated with an indirectly-heated gas turbine bottoming cycle using air as the working fluid. At least a portion of the air is provided to an oxygen enrichment PSA at suitable feed pressures for the PSA process; and the remainder of the air is compressed to a higher pressure as a gas turbine cycle working fluid indirectly heated by the fuel cell stack through heat exchangers coupled to the cathode and/or anode flow loops.

In other embodiments, including FIGS. 6–9 and 11 of this specification, the thermal bottoming working fluid is an anode loop gas in a gas turbine or Brayton cycle. If the hydrogen enrichment PSA is operated near ambient temperature, a recuperative heat exchanger is used to achieve high thermodynamic efficiency of the thermal bottoming cycle. Alternatively, if the hydrogen enrichment PSA is operated with its second end at an elevated temperature approaching that of the fuel cell stack while its first end is maintained at a heat rejection temperature near ambient, it may be used as a thermal rotary regenerator for the gas turbine cycle using anode gas as working fluid.

Hydrogen may be used as the fuel for SOFC power plants. With the anode gas as a thermal bottoming cycle working fluid, hydrogen containing a substantial fraction of steam (e.g. about 25% to about 50% steam in hydrogen) may be the working fluid for expansion, while the working fluid for compression is anode gases (preferably after post-reforming and water gas shift) from which fuel cell product water has been substantially removed by condensation. A radial flow expander may be used for the hydrogen/steam mixture exiting the fuel cell anode. Because of the low molecular weight of relatively dry hydrogen rich anode gases being compressed after condensation, alternative suitable compressors include high-speed centrifugal, multistage centrifugal, and positive displacement (e.g. twin screw) compressors.

For small power plants, the thermal bottoming cycle may use a separate working fluid from the cathode or anode gases, such as steam in a Rankine cycle or hydrogen in a Stirling cycle. For small SOFC fuel cells powered by hydrogen, the use of a Stirling engine for thermal bottoming is particularly attractive because the engine working fluid may be replenished from the hydrogen fuel supply. The need for completely leak-tight Stirling engine seals for working fluid containment is thus relaxed in the present application.

Because the present disclosed systems and processes use oxygen enrichment and hydrogen enrichment by PSA to elevate the voltage and/or current density delivered by the fuel cell stack, the fractional amount of fuel heating value delivered as high grade waste heat to a thermal bottoming cycle is greatly reduced over the prior art. Accordingly, the thermal bottoming working fluid flow rates and heat exchange duties are correspondingly reduced. The power rating of the thermal bottoming cycle is reduced in proportion to increased power delivered directly by the fuel cell stack. The net mechanical power delivered by the thermal bottoming cycle is applied predominantly or exclusively to the compression loads associated with the PSA auxiliaries.

FIG. 6

Figure 6:
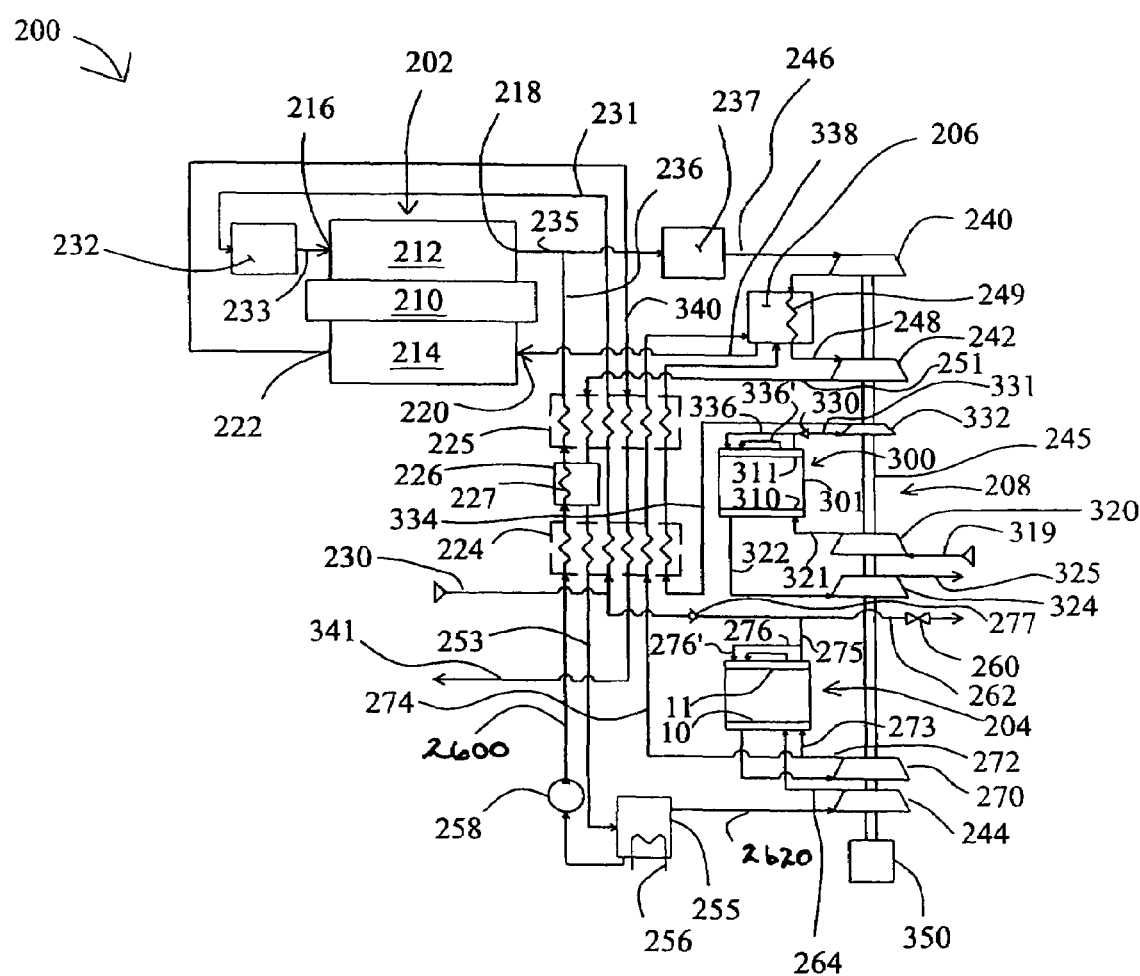
FIG. 6 shows a simplified schematic of a MCFC power plant embodiment.

FIG. 6 is a simplified schematic of an example of a fuel cell power plant 200, including a molten carbonate fuel cell 202, an anode gas separation PSA unit 204 co-operating with a combustor 206 (which may include a catalyst to ensure completeness of combustion) to enrich hydrogen for anode recycle and to transfer carbon dioxide from the anode side to the cathode side of the fuel cell, and an integrated gas turbine unit 208 for gas compression and expansion. The anode gas separation PSA unit 204 increases hydrogen concentration and reduces carbon dioxide concentration over the anode, thus increasing cell voltage. This directly increases fuel cell stack efficiency and electrical output, while also reducing the heat generated by the fuel cell so that the fraction of plant power output to be recovered less efficiently by a thermal bottoming cycle is reduced.

Molten carbonate fuel cell stack 202 includes the molten carbonate electrolyte 210 supported on a porous ceramic matrix, interposed between anode channel 212 and cathode channel 214. The anode channel has an inlet 216 and an outlet 218, while the cathode channel 214 has an inlet 220 and an outlet 222.

Thermal recuperators 224 and 225 cooperating with water gas shift reactor 226 are provided. The water gas shift reactor operates in a temperature range (e.g. about 200° C. to 300° C.) well below the operating temperature range of the fuel cell stack, and provides heat to boil water in heat recovery coil 227. Recuperator 224 operates across a lower temperature range below that of the water gas shift reactor, and recuperator 225 operates across a higher temperature range above that of the water gas shift reactor.

A first feed gas supply inlet 230 communicates by conduit 231 through recuperators 224 and 225 and pre-treatment unit 232 by conduit 233 to anode inlet 216, introducing preheated feed gas to the MCFC. The first feed gas supply may be externally compressed to match the anode working pressure in conduit 231. The feed gas is illustratively natural gas. Conduit 231 also receives a flow of recycled hydrogen-enriched gas from the first PSA unit 204 to make up a fuel gas mixture of the feed gas with excess hydrogen. Pre-treatment unit 232 provides desulphurisation, and may also include a pre-reformer to partially convert feed hydrocarbons to syngas (H2 and CO) and/or to at least partially convert higher hydrocarbons to methane. Steam may be supplied with the natural gas at inlet 230, or may be separately supplied to the pre-reformer or to anode inlet 216. The steam may be generated in heat recovery coil 227 cooperating with water gas shift reactor 226, or alternatively may be supplied by partial recycle of anode gas from the anode exit 218.

A portion of the feed gas is converted to generate hydrogen by internal reforming within the anode channel 212, which as known in the art may contain a suitable steam reforming catalyst such as nickel supported on alumina. In contrast with the typical prior art of supplying a substantial quantity of steam (e.g. steam/carbon ratio in the range of about 1.5 to 3) with the feed gas at the anode inlet 216, the present system teaches recycle of a large excess of hydrogen in the fuel gas mixture to the anode inlet with at most a minor amount of steam (e.g. steam carbon ratio less than about 0.5). The excess hydrogen is relied upon to suppress soot deposition.

In order to achieve the highest voltage efficiency, the ratio $$\left[\frac{P_{H2O(anode)} \cdot P_{CO2(anode)}}{P_{H2(anode)} \cdot P_{O2(cathode)}^{0.5} \cdot P_{CO2(cathode)}}\right]$$

must be as small as possible. This is achieved in the present embodiment, which maximizes the denominator of the above ratio by using the first PSA unit to enrich a large recycled excess of hydrogen for the anode, while concentrating carbon dioxide for the cathode. A second PSA unit is provided to enrich oxygen for the cathode, thus minimizing cathode side dilution by inert atmospheric gas components. The product of steam and carbon dioxide concentrations in the anode channel is also minimized, near the anode inlet by minimizing steam and carbon oxide components in the fuel gas mixture. Further along the anode channel, steam and carbon dioxide are generated by the fuel cell reactions and carbonate transfer from the electrolyte, but the product of steam and carbon dioxide concentrations is still kept unexpectedly low as a portion of the anode generated carbon dioxide is back shifted to carbon monoxide (by reverse water gas shift) owing to the large excess of hydrogen. Hence, the system enables a remarkable enhancement of fuel cell voltage (for this embodiment, voltage at constant current density can be increased by typically more than 200 millivolts compared to a similar MCFC stack operated on natural gas with a steam/carbon ratio of 2 and no PSA gas separation.).

The exothermic fuel cell anode reaction is $H_2 + CO_3^- \rightarrow H_2O + CO_2 + 2e^-$, with heat taken up by the endothermic steam reforming $CH_4 + H_2O \rightarrow CO + 3H_2$ and also by the reverse water gas shift $CO2 + H_2 \rightarrow CO + H_2O$ reaction. The present system considerably improves the heat balance, as (1) the fuel cell stack generates much less heat owing to the enhanced voltage generated, (2) the internal reforming reactions are more endothermic owing to the reverse water gas shift, and (3) a greater fraction of the fuel can be internally reformed because of the hydrogen back-pressure.

After passing through the anode channel with the above reactions, the anode gas mixture is withdrawn from anode exit 218 by conduit 235. Steam is added to conduit 235 from steam conduit 236, and the anode gas and steam mixture in conduit 235 is introduced to an optional post-reformer 237. Post-reformer 237 is essentially an adiabatic secondary reformer working at about the temperature of the fuel cell anode exit, and containing a steam reforming catalyst to perform the endothermic steam reforming reactions $CH_4 + H_2O \rightarrow CO + 3H_2$ and $CH_4 + 2H_2O \rightarrow CO_2 + 4H_2$, in approximate thermal balance with the exothermic water gas shift $CO + H_2O \rightarrow CO_2 + H_2$. A relatively small amount of methane and a larger amount of carbon monoxide react simultaneously to maintain approximate thermal balance. The adiabatic reformer is far less costly than a typical heat exchange reformer, as no high alloy tubes are required for heat exchange to the catalyst.

The integrated gas turbine unit 208 includes a first expander 240, a second expander 242, and an anode gas compressor 244 to provide expansion and compression of a gas turbine cycle using the reacting gas mixture circulating in the anode loop as working fluid of a regenerative Brayton cycle. The expanders and compressor are coupled to a mechanical load by shaft 245. The regenerative Brayton cycle works across a temperature range between approximately ambient temperature and the elevated temperatures established by the fuel cell anode exit 218, the post-reformer 237 and the combustor 206; and across a pressure range between ambient pressure and the working pressure of the fuel cell stack, here assumed to be about 3 to about 10 bars. Preferably after reacting in the post-reformer 237, the anode gas mixture is delivered by conduit 246 to the inlet of first expander 240. After expansion in first expander 240, the post-reformed anode gas is reheated by coil 249 in combustor 206 and conveyed by conduit 248 to the inlet of second expander 242. The anode gas stream is expanded in expander 242 to substantially the lower working pressure (which may be approximately atmospheric pressure if the fuel cell working pressure is well above atmospheric pressure, or may be a sub-atmospheric pressure if the fuel cell working pressure is only modestly elevated above atmospheric pressure). The anode gas is then conveyed by conduit 251 through the second recuperator 225 to the water gas shift reactor 226 at an intermediate temperature wherein a greater fraction of the initial carbon monoxide content is converted to carbon dioxide and hydrogen by reaction with steam. The fuel cell anode reaction provides steam for both the optional post-reformer and the water gas shift reactor, and supplementary steam generated by the exothermic heat of the water gas shift reactor 226 may be provided as shown by conduit 236. The anode gas mixture is conveyed by conduit 253 from the water gas shift reactor through the first recuperator 224 to a condenser 255 which is cooled to approaching ambient temperature by a cooler coil 256 from which low grade waste heat is rejected by the power plant. This low grade heat may be applied to building or water heating cogeneration duties.

Condensed water is pumped from condenser 255 by water feed pump 258, and through recuperator 224 by conduit 2600 to evaporator coil 227 for heat recovery from the exothermic water gas shift reaction in reactor 226. The relatively dry anode gas mixture is then conveyed from condenser 255 by conduit 2620 to the inlet of compressor 244. Compressor 244 compresses the anode gas mixture to the higher pressure of the first PSA unit, which is slightly above the working pressure of the fuel cell anode by a sufficient pressure difference to overcome frictional pressure drops in conduits and the recuperators. Compressor 244 delivers the compressed anode gas mixture by conduit 264 to a feed production compartment in first rotary valve face 10 of the first PSA unit 204. The carbon dioxide enriched heavy product stream is released from the blowdown and exhaust compartments in first rotary valve face 10 into conduit 266 at the lower pressure of the first unit PSA cycle, and is introduced by conduit 266 to the inlet of a carbon dioxide compression machine 270 (or vacuum pump, if the lower pressure is subatmospheric). The higher pressure of the first PSA is slightly above the working pressure of the MCFC, while the lower pressure may be atmospheric or subatmospheric. If the MCFC working pressure were selected to be near atmospheric, the first PSA would be a vacuum PSA with the lower cycle pressure in the range of about 0.1 to 0.5 bars absolute.

The heavy product stream from conduit 266 is compressed back up to the higher pressure of the first PSA by carbon dioxide compressor 270, which delivers the compressed heavy product stream to conduit 272 which branches to heavy reflux conduit 273 communicating to a feed production compartment in first rotary valve face 10 of the first PSA unit 204, and conduit 274 communicating to combustor 206. Alternatively, if the heavy product stream in conduit 266 is at sub-atmospheric pressure, then compression machine 270 could be a vacuum pump for extracting the heavy product stream.

Enriched hydrogen light product gas from first PSA 204 is delivered by conduit 275 from the second rotary valve face 11 of the first PSA unit. Conduit 275 communicates by non-return valve 277 to conduit 231, and thence via pre-treatment unit 232 to anode inlet 216. Two stages 276 and 276' of light reflux are shown, in which separate streams of light product gas at successively declining pressures are withdrawn from the second rotary valve face 11 for pressure letdown (e.g. by respective stages of a light reflux expander 140 as shown in FIG. 5A), and then returned to the second rotary valve face for purging and repressurization of the adsorbers. The first PSA unit may be operated to achieve high purity of the enriched hydrogen, as would be particularly desirable if any of that hydrogen is to be exported as a product of the power plant to external hydrogen consumers. However, the first PSA unit may alternatively be operated to achieve a lesser degree of hydrogen enrichment, so that a portion of unreacted methane and carbon monoxide is recycled with the hydrogen to the fuel cell anode. Operation at lower hydrogen purity will facilitate high recovery of hydrogen for recycle to the anode.

The anode loop thus comprises conduit 231 heating the feed and recycle hydrogen through the recuperators 224 and 225, pre-treatment unit 232, conduit 233, the anode channel 212, conduit 235, post-reformer 237, conduit 246, expansion turbines 240 and 242, conduit 248 and reheat coil 249 (which alternatively might be used as a superheat coil either upstream or downstream of post-reformer 237), conduits 251 and 253 cooling the anode gas mixture through recuperators 225 and 224 and the water gas shift reactor 226, condenser 255, conduit 2620, compressor 244, conduit 264, the first PSA unit, and conduit 275 and non-return valve 277 delivering enriched hydrogen back to conduit 231. In this anode loop, hydrogen is recirculated and natural gas is replenished for substantially complete utilization of the hydrogen and other fuel components, while carbon dioxide is continually removed by PSA 204. A pressure booster means may be useful to overcome flow pressure drop around the anode loop, which in this example is provided by compressor 244. Optionally, the heavy reflux step and conduit 273 may be eliminated, which will increase the fraction of fuel gas components (hydrogen, carbon monoxide and methane) delivered to combustor 206. With a relatively high-pressure ratio between the higher and lower pressures in the first PSA, relatively high recovery of the fuel gas components in the light product gas (for recycle to the fuel cell anode) will be achieved. With a sufficiently large heavy reflux stream, and corresponding power consumption in heavy product of carbon dioxide and/or water vapour so that combustor 206 might be eliminated or replaced with a small catalytic combustor. Combustor 206 burns residual fuel values (including some hydrogen and unconverted carbon monoxide and fuel) in the carbon dioxide rich heavy product stream. A catalyst may be provided in combustor 206 to ensure stable combustion with high inert concentrations, or supplemental fuel may be added thereto.

An oxygen VPSA unit 300 is preferably (but not necessarily) provided in order to boost the oxygen and carbon dioxide partial pressures in the cathode channel, so as to increase the cell electromotive force and thus reduce the thermal bottoming load while enhancing overall plant efficiency. The oxygen PSA or VPSA unit 300 includes a rotary module 301 with nitrogen-selective adsorbent in the adsorbers thereof, a first rotary valve face 310 and a second rotary valve face 311. The first rotary valve face 310 receives compressed feed air at a feed production compartment from air intake 319 and feed air compressor 320 via conduit 321, and discharges exhaust nitrogen enriched air from an exhaust compartment via conduit 322 to an optional vacuum pump 324 (to be included for VPSA or excluded for simple PSA) for discharge to atmosphere by conduit 325 or to any other use for moderately enriched nitrogen. The second rotary valve face 311 delivers enriched light product oxygen at e.g. 90% purity by non-return valve 330 in conduit 331 to oxygen compressor 332 which delivers the oxygen at a pressure of at least the MCFC working pressure to conduit 334, recuperators 224 and 225, and thence combustor 206. Two light reflux stages 336 and 336' with appropriate means for pressure letdown (e.g. energy recovery expander or throttles as shown respectively in FIGS. 5A and 5B) are also provided in cooperation with the second rotary valve face 311.

Oxygen enrichment of the air provided to combustor 206 may substantially reduce the inert load of nitrogen and argon in the cathode channel, thus enhancing electrochemical energy conversion performance as discussed above. Moreover, oxygen enrichment may provide more complete combustion without a catalyst or with a smaller amount of catalyst, and will substantially eliminate the production of NOX emissions. The effluent gas from combustor 206 contains $CO_2$ from the first PSA unit heavy product and oxygen from the second PSA unit, plus minor amounts of inert components (e.g. argon and nitrogen incompletely separated by the oxygen VPSA unit) plus a small amount of steam as a product of combustion. A typical composition may be 60% $CO_2$, 30% O2 and balance inerts and steam.

This gas is introduced by conduit 338 to the cathode inlet 220 as MCFC oxidant. Cathode exhaust gas is withdrawn from cathode channel exit 222 by conduit 340, and is exhausted from the power plant by conduit 341 after heat recovery in the recuperators 225 and 224. In FIG. 6 as shown, the cathode exhaust gas is delivered from conduit 341 at substantially the fuel cell working pressure, as would be convenient for delivering concentrated $CO_2$ for disposal or sequestration after further processing to remove residual atmospheric gas components. The cathode exhaust gas may alternatively be expanded across an energy recovery expander (not shown here, but included in several embodiments of copending patent application "Energy Efficient Gas Separation for Fuel Cells" filed Oct. 26, 2001) before heat recovery in the recuperators 225 and 224. Such a cathode gas energy recovery expander may be used to drive any of the plant mechanical loads, e.g. pump 258, the rotary PSA modules 204 and 300 as rotor drive means equivalent to motor 163, or any of the compressors or blowers 244, 270, 320 and 332.

Gas turbine assembly 208 is schematically shown in FIG. 6 as including expanders 240 and 242 driving compressors 244, 270, 320, and 332, as well as vacuum pump 324, all coupled by shaft 245. This assembly is also shown as coupled to a motor/generator 350 to provide starting power and/or to absorb any excess power available from the gas turbine assembly. It will be appreciated that separate compressors could be powered by individual expanders 240 and 242, or by light reflux expanders cooperating with either PSA units 204 or 300, or by a cathode exhaust gas expander.

Finally, the power plant is shown with a hydrogen delivery valve 260 and hydrogen delivery conduit 262 for delivering purified hydrogen from the first PSA unit 204 to storage for load-leveling, or to an external consumer of hydrogen such as vehicle refueling. While the substantial purification of a hydrogen stream by the first PSA unit for recycle to the fuel cell anode is essential for the improvement of power plant electrical generation performance as taught by the present system, this capability also provides the benefit of cogeneration flexibility, since the power plant can export hydrogen as well as electrical power. Turndown of electrical generation during intervals of low electrical demand can enable enhanced production of hydrogen during those intervals.

The adsorber working temperature of the first PSA may be close to ambient temperature, in which case heat exchangers 224 and 225 will be heavily loaded recuperators. Alternatively, the first PSA may operate at elevated temperature, in which case the second temperature adjacent the second valve face is preferably elevated relative to the first temperature adjacent the first valve face, so that the adsorber rotor functions as a thermal rotary regenerator. The working temperature of the first PSA unit 204 may be close to that of the fuel cell stack or the reformer reactor. For example, the working temperature of the H2 PSA unit may be within about 100 to about 200° C. of fuel cell stack or the reformer reactor. If the working temperature of the first PSA unit is high enough for the methane steam reforming reaction (e.g., at least about 600° C.) and a suitable catalyst is included within the adsorbers thereof, the steam reforming reaction may be conducted as sorption enhanced reaction within the PSA unit in an adsorber zone approaching or exceeding about 600° C. At somewhat lower temperatures of the first PSA unit (e.g., at least about 200° C. to about 300° C.), water gas shift may be conducted by sorption enhanced reaction over a suitable catalyst within the adsorbers so that water gas shift reactor 226 (or a portion thereof) may be integrated with PSA unit 204. At still lower temperatures down to ambient, the first PSA unit may be operated with conventional adsorbents for adsorbing $CO_2$ from hydrogen.

FIGS. 7–12

The following embodiments illustrate application of the systems to solid oxide fuel cell power plants. It will be appreciated that the features of these embodiments may equivalently be applied to molten carbonate fuel cell power plants. Embodiment 400 of FIG. 7 resembles embodiment 200 of FIG. 6, except for the substitution of a solid oxide fuel cell SOFC for the MCFC. SOFC stack 402 includes a solid oxide electrolyte membrane 210 interposed between anode channel 212 and cathode channel 214. The anode channel has an inlet 216 and an outlet 218, while the cathode channel 214 has an inlet 220 and an outlet 222. If the fuel is natural gas, it is internally reformed within the anode channel 212, while a suitable excess concentration of recycled hydrogen is maintained in the anode loop so as to prevent carbon deposition.

Figure 7:
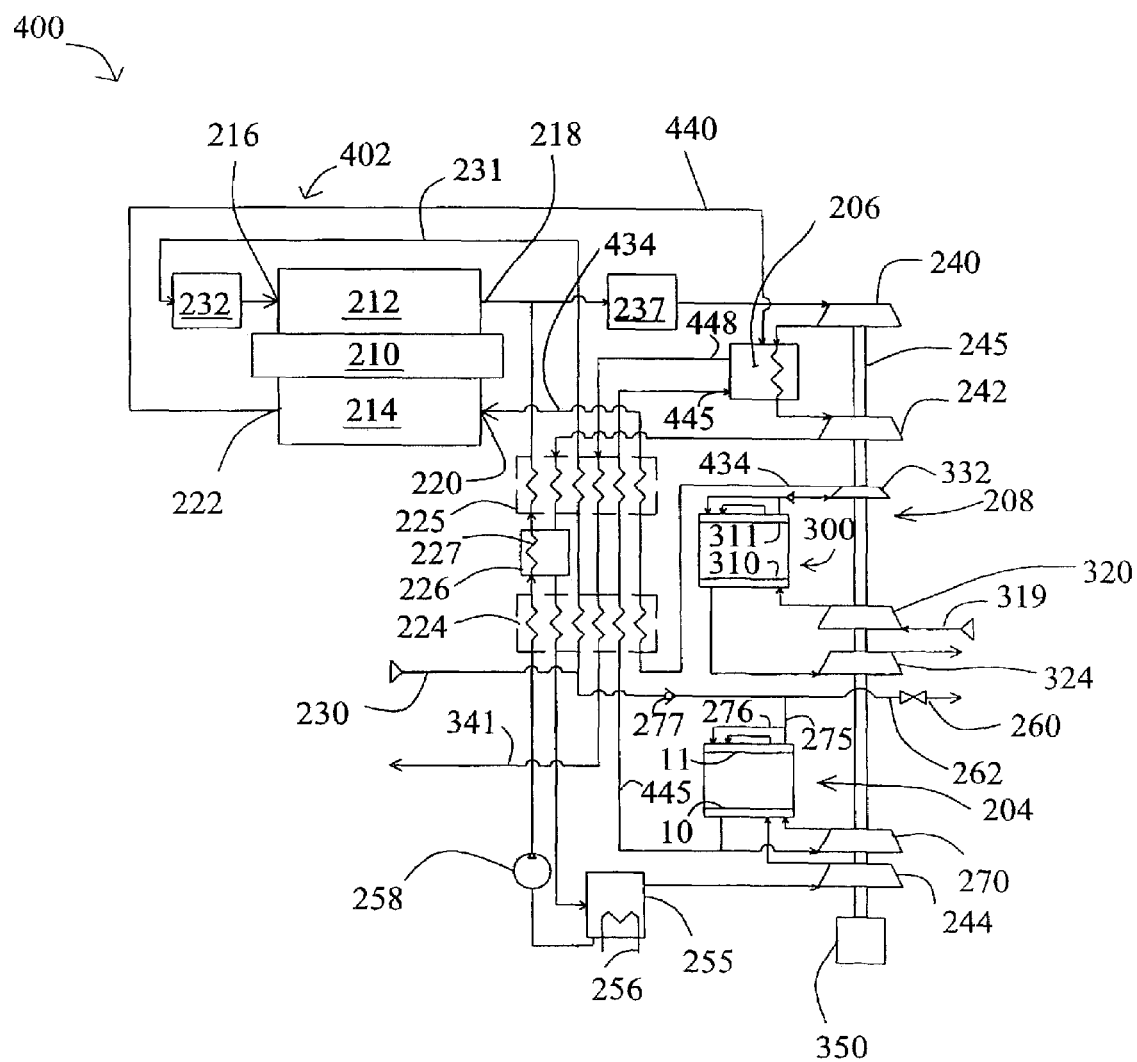
FIGS. 7 through 14 show simplified schematics of alternative SOFC power plant embodiments.

Several important differences arise between SOFC and MCFC configurations, as it is no longer necessary to transfer $CO_2$ from the anode loop to the cathode as in the MCFC embodiment of FIG. 6. In FIGS. 7–11, enriched oxygen is delivered from VPSA unit 300 and optional oxygen product compressor 332 directly to the cathode channel inlet 220 by conduit 434 through recuperators 224 and 225. Exhaust cathode gas is conveyed from the cathode channel exit 222 by conduit 440 to combustor 206, thus providing the combustor oxidant with heat recovery from the cathode channel. The heavy product gas ($CO_2$ enriched tail gas) from first PSA unit 204 is conveyed by conduit 445 through recuperators 224 and 225 to combustor 206 for combustion of residual fuel values therein. If desired, the heavy product gas may be compressed by carbon dioxide compressor 270 before introduction to conduit 445. Carbon dioxide exhaust from combustor 206 is discharged by conduit 448 with heat recovery in recuperators 225 and 224, before being discharged by exhaust conduit 341. This exhaust stream is highly concentrated $CO_2$ which may be sequestered if desired after compression by use for example in enhanced oil recovery or displacement of deep coal bed methane. In the embodiment of FIG. 7, the $CO_2$ rich exhaust stream is delivered at substantially the working pressure of the fuel cell, but may be expanded to atmospheric pressure by an energy recovery expander if desired.

Figure 8:
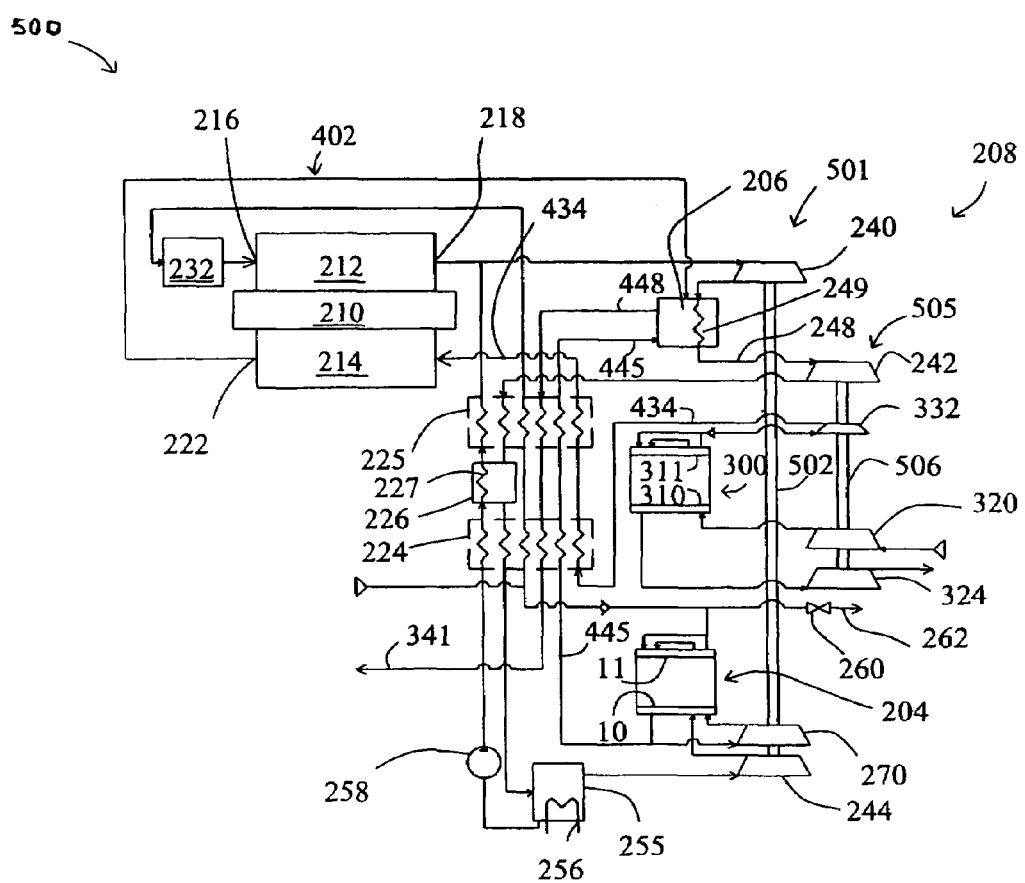

FIG. 8 illustrates an embodiment 500 in which the gas turbine assembly 208 is separated into two separate energy recovery free rotor or "turbocharger" spools. Thus, a first rotor 501 includes expander 240 driving compressors 244 and 270 by shaft 502. A second energy recovery rotor 505 includes expander 242 driving compressors 320 and 332, as well as vacuum pump 324, all coupled by shaft 506. Additional energy recovery rotors coupled to appropriate compression loads may be provided in association with light reflux expanders in PSA units 204 or 300.

Figure 9:
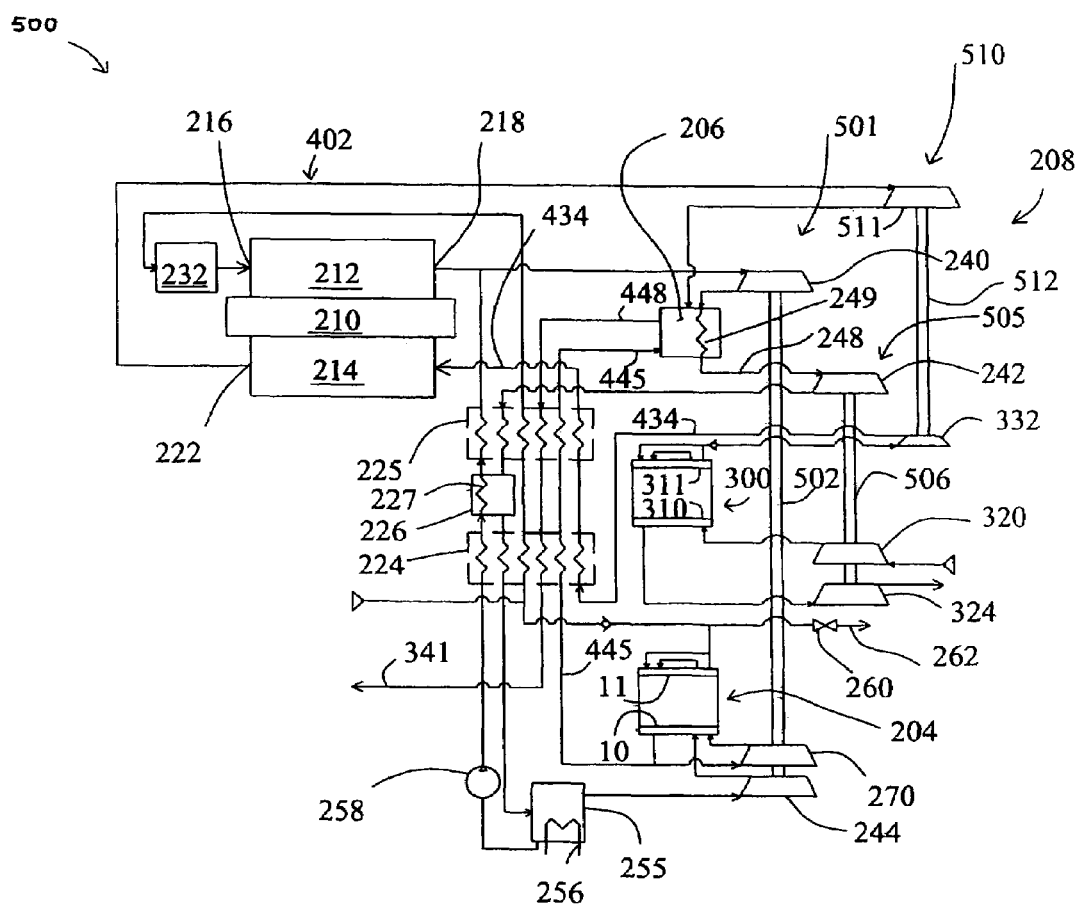

FIG. 9 shows a modification of embodiment 500, in which a third gas turbine spool 510 includes an expander 511 for pressure let-down of cathode exhaust gas so that the exhaust gas stream is discharged from conduit 341 at substantially atmospheric pressure. Expander 511 is shown as driving oxygen compressor 332 by shaft 512. It will be appreciated that the energy recovery expanders 240, 242 and 511 may be coupled to the compressor, blower and vacuum pump loads, as well as other auxiliary mechanical loads such as driving rotation of PSA rotary modules, water pumps, fuel pumps and cogeneration product hydrogen compressors in any combination.

Figure 10:
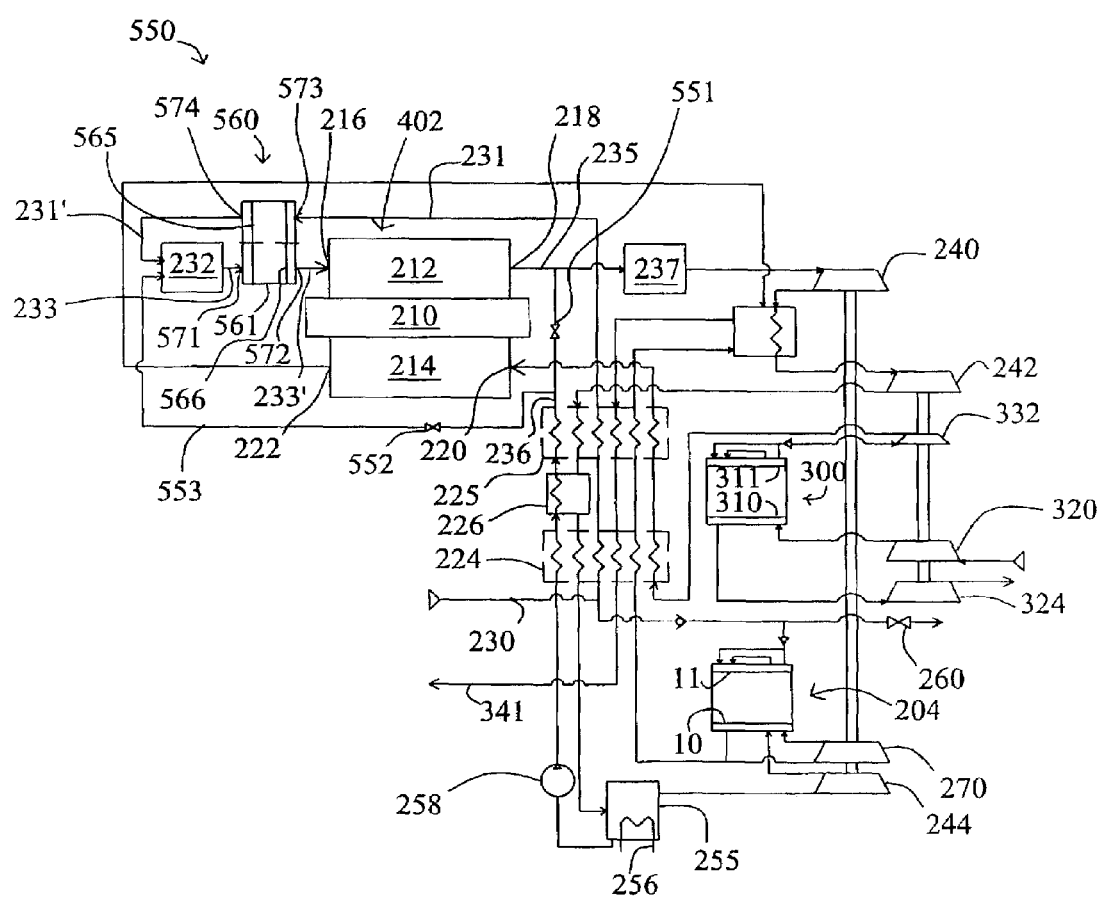

FIG. 10 shows embodiment 550 in which pre-treatment unit 232 is a pre-reformer for partially converting the feed fuel to syngas (hydrogen and carbon monoxide) as well as methanating part of that syngas, so that higher hydrocarbons are at least partially converted to methane in order to reduce the risk of soot deposition in the fuel cell anode channel. The pre-reformer will use a steam reforming catalyst that may be selected for tolerance to feed impurities, and may operate at a relatively low temperature in the range of about 400° C. to about 600° C. so as to promote the methanation reaction. The pre-reformer may operate adiabatically, with at least partial heat balance between the endothermic steam reforming reaction and the exothermic methanation reaction. In the present system, methane is a desirable component of the anode feed since it will act as a scavenger (by steam reforming) for water generated by the fuel cell reaction. Recycle hydrogen from the first PSA unit may be passed through the pre-reformer with the feed fuel, or alternatively may be bypassed directly to the anode inlet 216 without passing through the pre-reformer.

Steam must be added to the inlet of pre-reformer 232 at a sufficient concentration for steam reforming and coking suppression in the pre-reformer. Embodiment 550 includes steam flow control valves 551 and 552 branching from conduit 236, for respectively admitting steam to the post-reformer 237 by conduit 235, and to the pre-reformer by conduit 553.

Unreacted steam is preferably removed from the pre-reformer effluent before admission to the anode inlet 216. In FIG. 10 water vapour is extracted by a rotary desiccant humidity exchanger 560 coupled between conduits 231 and 233. Humidity exchanger 560 includes a desiccant wheel 561 engaged at first and second ends with rotary valve faces 565 and 566. The humidity exchanger transfers water vapour from the pre-reformed effluent in conduit 233 to pre-reformer feed conduit 231, so as to remove water vapour from the hydrogen rich gas mixture entering the anode channel inlet 216 and recycling that water vapour for steam methane reforming in the pre-reformer, with steam make-up as required from conduit 553.

Conduit 233 carries humid pre-reformate gas through port 571 to valve face 565 into one side of the desiccant wheel from which dried anode feed gas is delivered through valve face 566 by port 572 to conduit 233' connecting to anode inlet 216. Conduit 231 delivers a dry fuel gas mixture of feed fuel gas and recycle hydrogen by port 573 to valve face 566; and this fuel gas mixture flows through the dessicant wheel to be humidified before exiting valve face 565 by port 574 to conduit 231' and pre-reformer 232. The driving force for humidity transfer may be augmented by either establishing a higher temperature in conduit 231 relative to a lower temperature in conduit 233, or by establishing a higher pressure in conduits 233 and 233' relative to a lower pressure in conduits 231' and 231.

Figure 11:
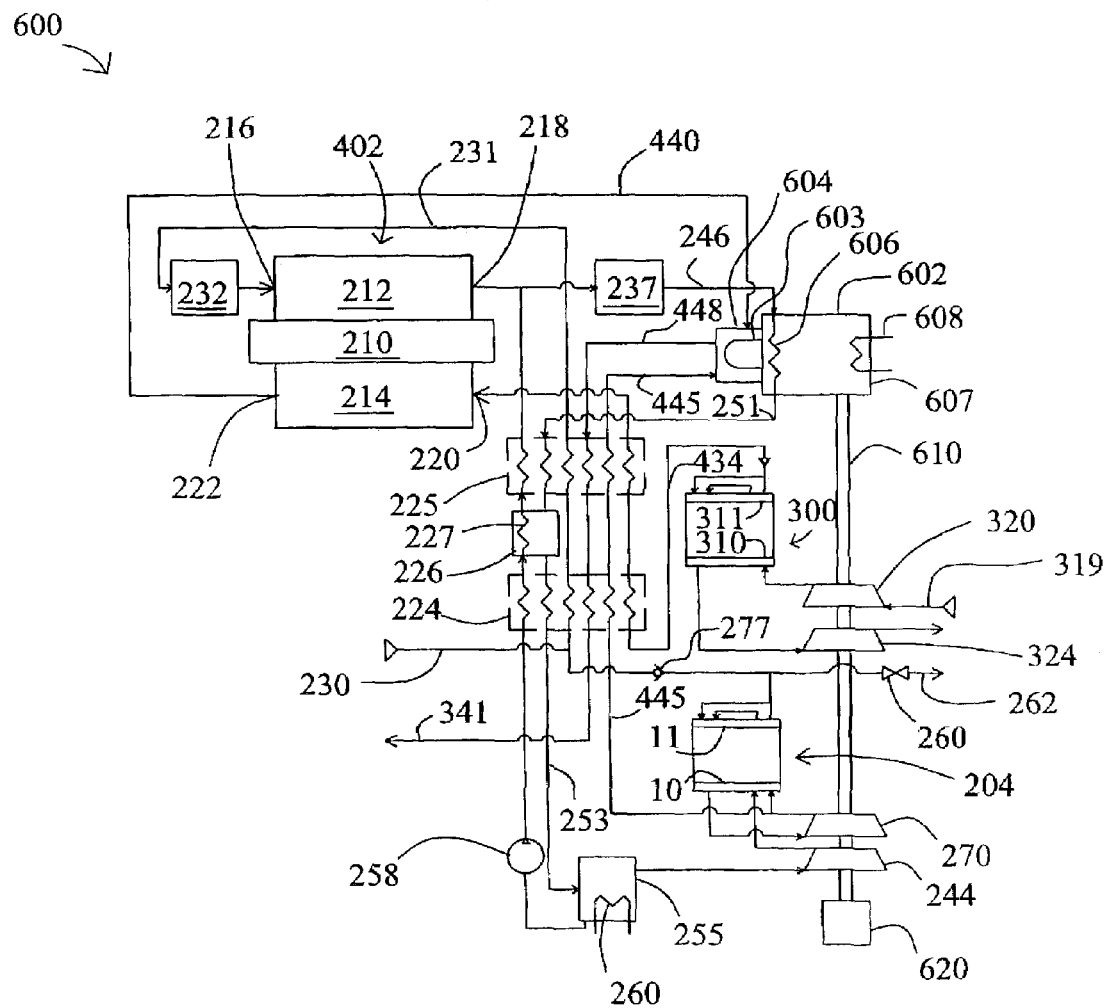
Figure 12:
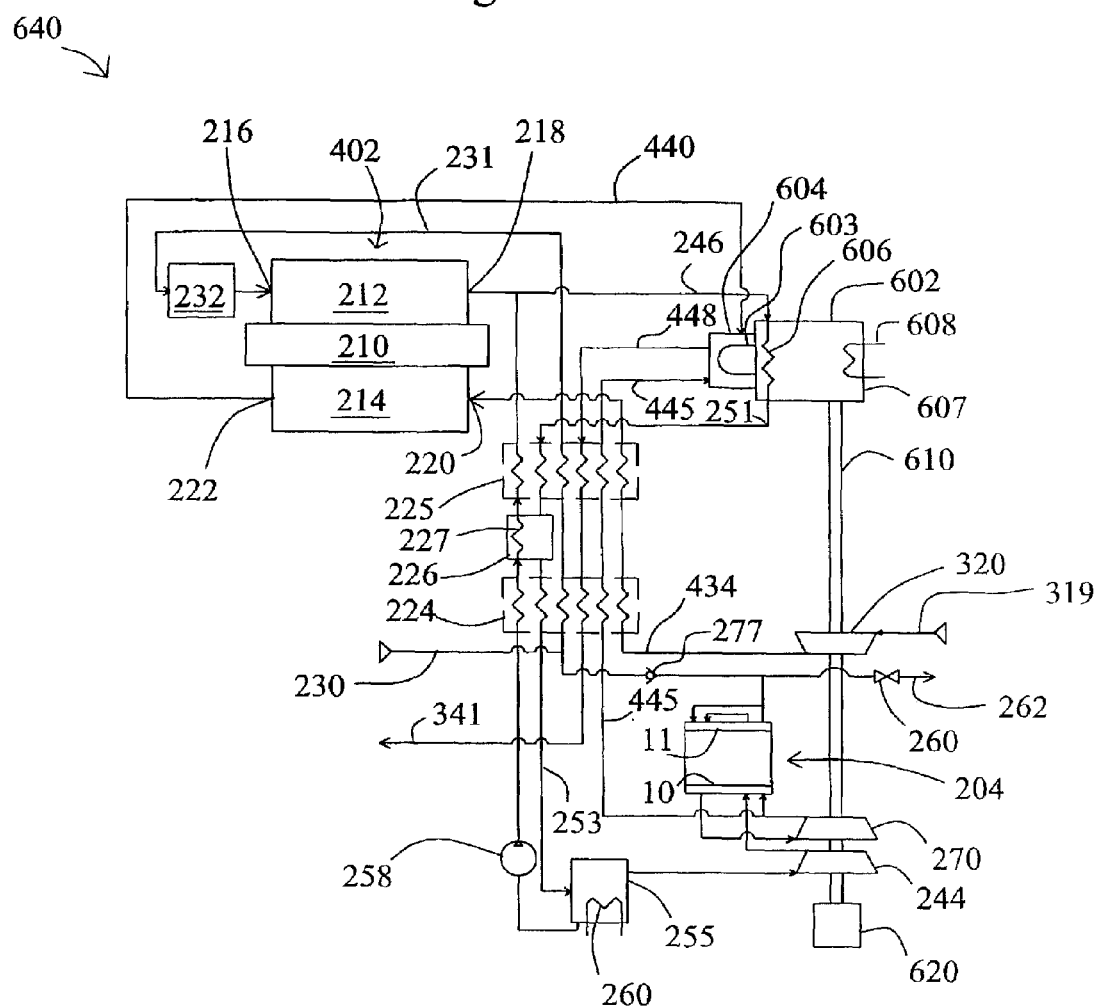

FIGS. 11 and 12 illustrate a category of embodiments in which the anode gas mixture is not used directly as the working fluid for a fuel cell stack heat recovery thermodynamic cycle. In embodiment 600 of FIG. 12, an engine 602 is used as the thermal bottoming system to recover waste heat. Engine 602 has a hot end 603 heated by combustion chamber 604 (in which the heavy product gas from the first PSA unit is combusted with cathode exhaust gas from conduit 440 or alternatively with air) and by heater coil 606 receiving hot anode gas mixture by conduit 246 from post-reformer 237 and the anode exit 218. Engine 602 might also alternatively receive heat from water gas shift reactor 226. Engine 602 has a cold end 607 which has a cooler or radiator 608 to reject heat at substantially ambient temperature. Engine 602 may be a gas turbine using air as its working fluid (as in some embodiments of copending patent application "Energy Efficient Gas Separation for Fuel Cells" filed Oct. 26, 2001, whose entire disclosure is incorporated herein), heated by indirect heat exchange with the anode and/or cathode gases and by combustion of the heavy product exhaust gas from the first PSA unit and/or by combustion of supplemental natural gas fuel. Engine 602 may include an internal combustion engine fuelled by heavy product exhaust gas from the first PSA unit and/or by supplemental natural gas fuel. Alternatively, engine 602 may be a steam engine or steam turbine, with hot end 603 including a boiler heated at least in part by combustion chamber 604, and cold end 607 including a condenser rejecting low grade waste heat to cooler or radiator 608.

Since the first PSA unit generates purified hydrogen, a preferred embodiment 600 would use a Stirling engine with hydrogen working fluid as engine 602. The hydrogen working fluid is expanded within hot end 603 and is compressed within cold end 607. Compressed hydrogen is a particularly desirable working fluid for high performance Stirling engines. A Stirling engine as engine 602 may have a kinematic crank mechanism to drive shaft 610 coupled to the oxygen PSA feed blower 320, an optional PSA vacuum pump 324, compressors 244 and 270 co-operating with the first PSA unit 204, and an optional generator 620 which may also represent a starter motor. Alternatively, a free piston Stirling engine mechanism may be used to drive all or some of the above compression loads directly without a shaft coupling. Compressor pistons for compressors 244, 270 and 320, and for vacuum pump 324, may be driven directly by pistons of the Stirling engine, which may optionally have a kinematic crank mechanism for coordination of the reciprocating pistons.

FIG. 12 shows a simplified embodiment 640, similar to embodiment 600 but without an oxygen enrichment PSA or a post-reformer. In the examples of FIGS. 11 and 12, the fuel cell working pressure may be close to atmospheric pressure, so that the hydrogen PSA 204 will operate in a vacuum mode. It may be noted that fuel cell excess heat is transferred to the engine 602, both from the anode exhaust gas via heat exchanger 606, and from the cathode exhaust gas with augmentation from combustion of hydrogen PSA tail gas in combustion chamber 604.

Figure 13:
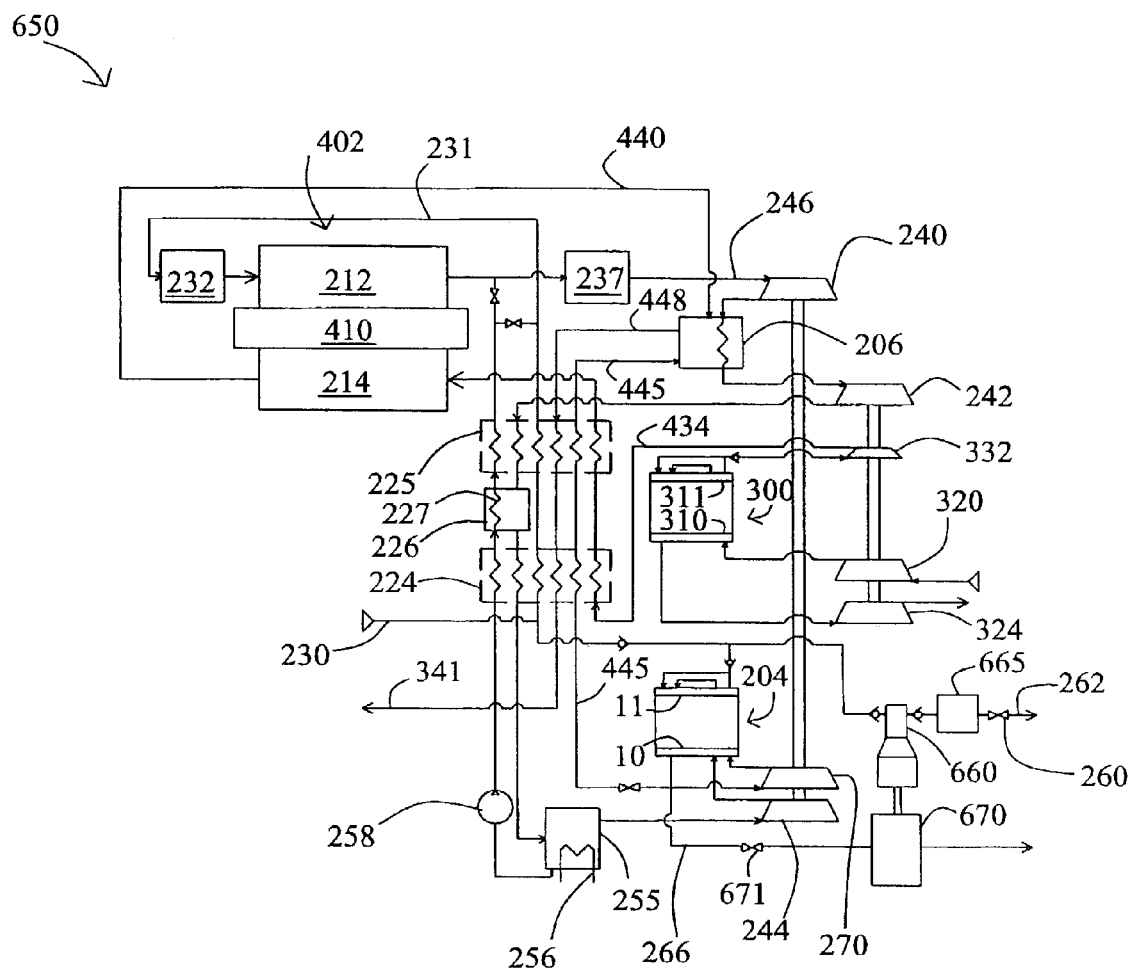

FIG. 13 shows an embodiment 650 with a hydrogen product compressor 660 delivering product hydrogen into a storage vessel 665, from which compressed and purified hydrogen may be delivered to external hydrogen consumers by hydrogen product delivery valve 260. Compressor 660 is shown as powered by an internal or external combustion engine 670, which is fuelled by combustion of the heavy product gas from the first PSA unit 204, with this low grade fuel gas delivered to engine 670 by conduit 266 and valve 671. Alternatively, hydrogen product compressor 660 may be powered by an electric motor which may draw current from the fuel cell stack, or by an engine or turbine recovering fuel cell waste heat as in preceding embodiments.

The cogenerated hydrogen may be delivered to an external use, stored, or supplied to a PEM fuel cell cooperating with the SOFC. The required hydrogen purity may be relatively high when the hydrogen is delivered or stored for external use, at which time the SOFC electrical output may be reduced. When peak SOFC electrical output is desired, hydrogen delivery to external use or storage may be stopped, and the hydrogen purity may then be relaxed so as to achieve greater electrical generation efficiency. Cogeneration of hydrogen may thus be used as a load levelling technique for most productive use of a SOFC or MCFC power plant supplying hydrogen when electrical demand is reduced, or supplying electrical power (e.g. to the electrical grid) when hydrogen demand is reduced as in a hydrogen refueling station at times of low demand.

Figure 14:
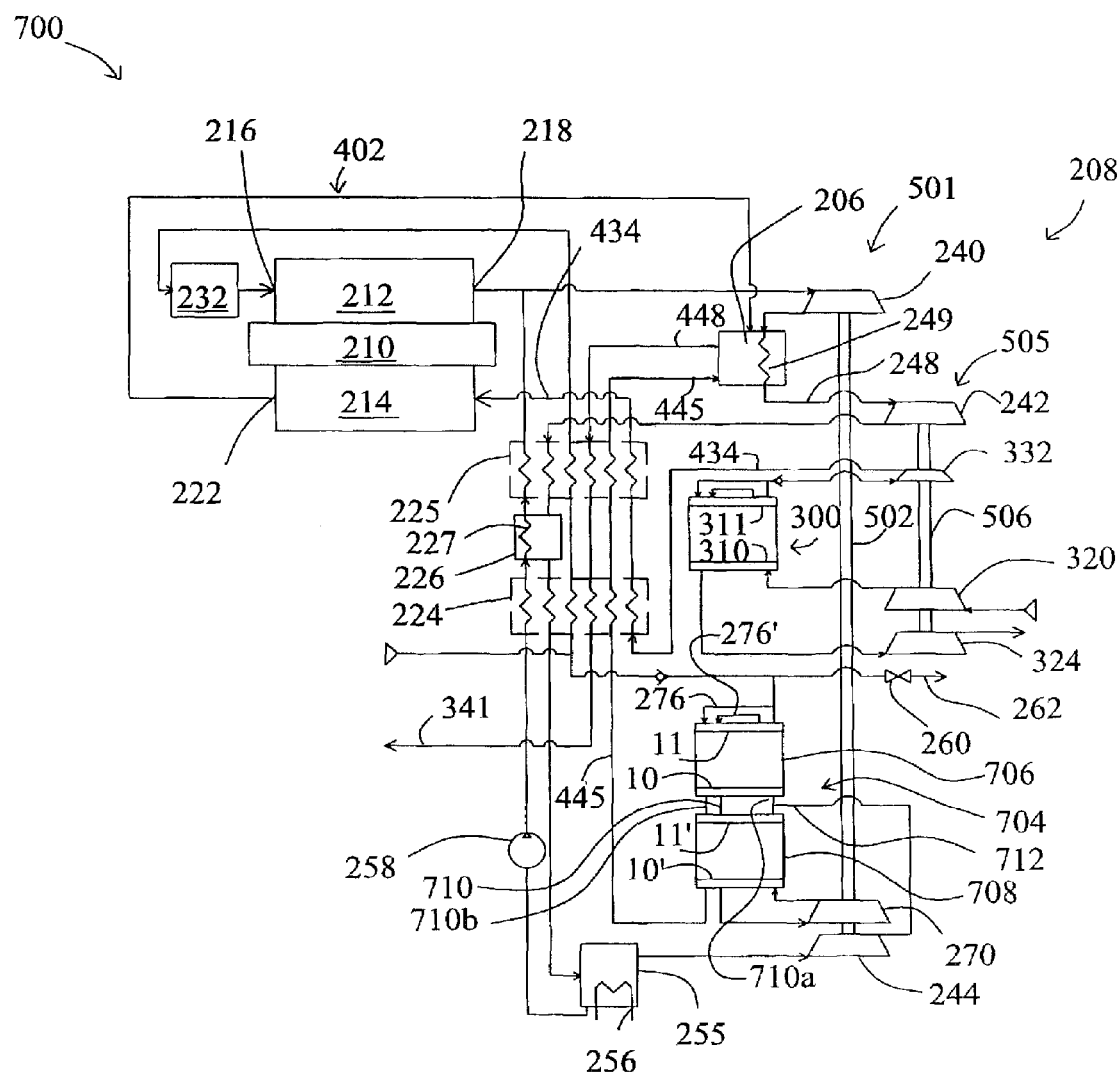

FIG. 14 shows an illustrative embodiment 700 with the hydrogen PSA unit provided as a two stage PSA system. The two stage hydrogen PSA unit 704 includes a hydrogen enrichment stage provided as rotary adsorber module 706, cooperating with a carbon dioxide enrichment stage provided as rotary adsorber module 708. The hydrogen enrichment rotary adsorption module 706 has a first valve face 10 and a second valve face 11, while the carbon dioxide enrichment rotary adsorption module 708 has a first valve face 10' and a second valve face 11'. A plurality of interconnection conduits 710 are provided between valve faces 10 and 11', so as to provide fluid communication between adsorbers which are at substantially the same instantaneous working pressure and phase of the PSA cycle in respectively modules 706 and 708. The feed is delivered from compressor 244 via conduit 712 to an interconnection conduit 710a corresponding to the higher pressure of the PSA cycle, while heavy reflux from heavy reflux compressor 270 is admitted to valve face 10' also at the higher pressure of the PSA cycle, with enriched hydrogen also being delivered at the higher pressure from valve face 11. During a lower pressure interval of the PSA cycle, module 706 is purged by a light reflux flow, while impurities including CO2 are transferred from valve face 10 to valve face 11' by an interconnnection conduit 710b corresponding to the lower pressure, and concentrated CO2 is delivered from valve face 10' to conduit 445 or heavy reflux compressor 270. The highest CO2 concentration may be achieved at valve face 10' during a countercurrent blowdown step of the PSA cycle, when the CO2 enriched stream would preferably to delivered to conduit 445. For given hydrogen purity and recovery, heavy reflux flow and associated compression power consumption are reduced with the two stage hydrogen PSA, especially when the feed hydrogen concentration is relatively high.

Figure 15:
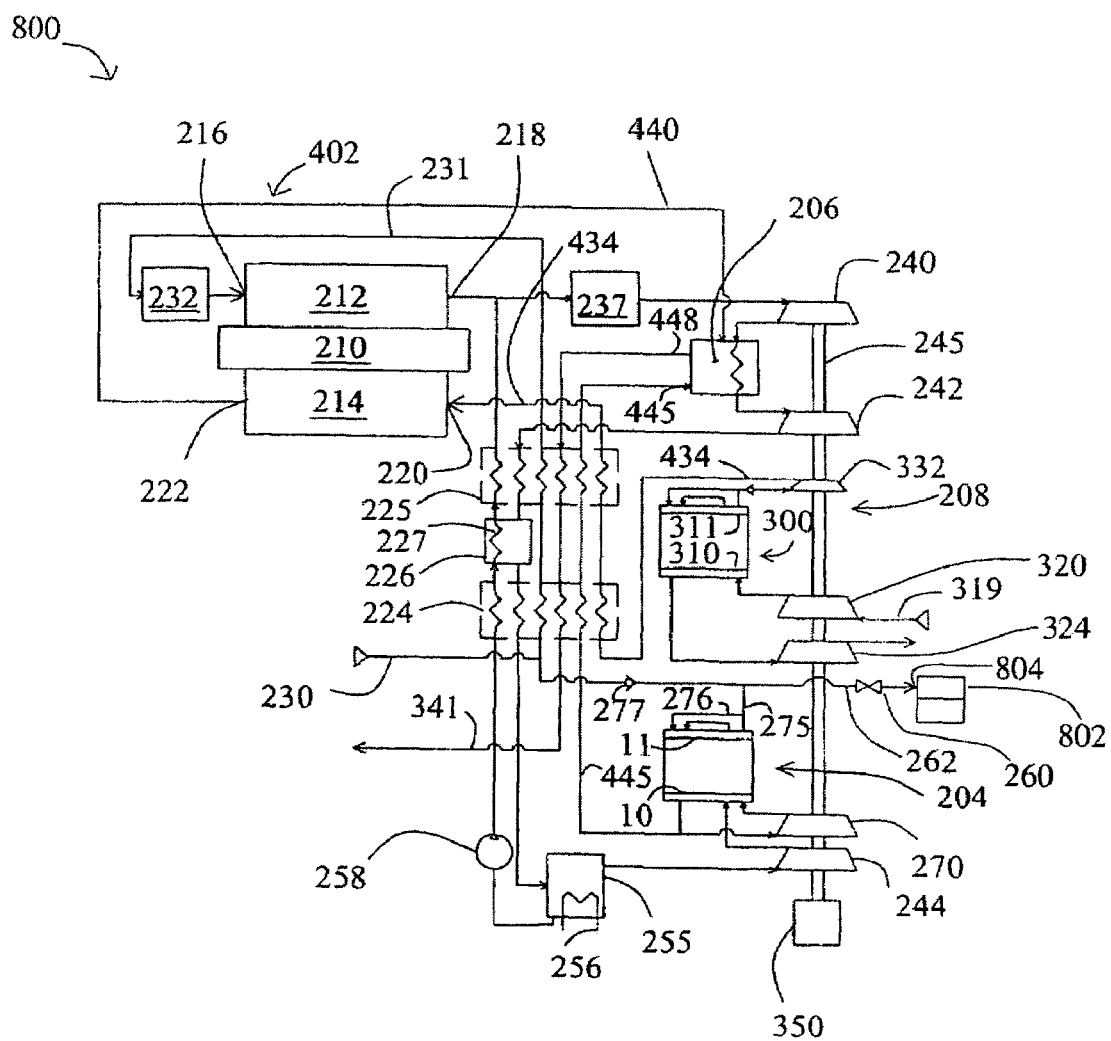
FIG. 15 shows a simplified schematic of a fuel cell system including a high temperature fuel cell and a low temperature fuel cell.

FIG. 15 shows an illustrative embodiment 800 similar to the embodiment 400 of FIG. 7, but also including a low temperature fuel cell 802. The low temperature fuel cell 802 can be, for example, a polymer electrolyte membrane fuel cell. In the embodiment 800, the low temperature fuel cell 802 includes an anode inlet 804 that receives hydrogen fuel from the delivery conduit 262.

Any of the embodiments in FIGS. 7–14 may be adapted to a MCFC plant by transferring $CO_2$ from the heavy product stream of the first PSA unit 204 to the cathode inlet for mixing into either air or an enriched oxygen stream so as to provide a suitable MCFC cathode oxidant stream with two moles of $CO_2$ for each mole of $O_2$ consumed. The inventive power plants will not generate any significant NOx emissions if the oxidant to the combustor is highly enriched oxygen generated by the oxygen PSA or VPSA unit 300. Since anode tail gas will be mostly $CO_2$ with very little heating value of fuel components, enriched oxygen is desirably used as the oxidant, to avoid or minimize the need for a catalyst that would be needed for combustion of such extremely low BTU gas in air.

It will be evident that there may be many other alternatives and variations of the disclosed systems and processes.

For MCFC and SOFC power plants, the disclosed systems and process will enhance power generation performance by maximizing the ratio of hydrogen to steam partial pressure in the anode, while for MCFC systems also maximizing the ratio of $CO_2$ in the cathode channel to $CO_2$ in the anode channel. Estimated efficiencies based on fuel lower heating value are in the rough range of 60% to 75% for natural gas fuelled fuel cell power plants. The system also facilitates cogeneration of (1) efficiently generated electrical power, (2) purified and compressed hydrogen, (3) concentrated CO2 as a useful byproduct or for sequestration, and (4) low-grade waste heat suitable for building heating or domestic hot water utilities.

Having illustrated and described the principles of my disclosure with reference to several embodiments, it should be apparent to those of ordinary skill in the art that the presently disclosed systems and methods may be modified in arrangement and detail without departing from such principles.

What is claimed is:

1. A high temperature fuel cell power generation system comprising:
 a high temperature fuel cell having an anode inlet and exhaust, and a cathode inlet and exhaust;
 gas separation means operable to recover hydrogen gas from the anode exhaust and to provide at least a portion of such hydrogen gas for recycle to the anode inlet;
 energy recovery means operable to recover energy from the fuel cell exhaust gases and to provide at least a portion of such recovered energy to drive mechanical loads associated with the operation of the gas separation means;
wherein a portion of the recovered hydrogen gas is provided for export from the generation system as hydrogen fuel.

2. The high temperature fuel cell power generation system of claim 1 wherein the high temperature fuel cell is a solid oxide fuel cell.

3. The high temperature fuel cell power generation system of claim 2 wherein the gas separation system is additionally operable to concentrate carbon dioxide gas from the fuel cell exhaust gases and to provide at least a portion of such concentrated carbon dioxide gas for export from the generation system to prevent its release into the atmosphere.

4. The high temperature fuel cell power generation system of claim 2 wherein gas separation means comprises a pressure swing adsorption module.

5. The high temperature fuel cell power generation system of claim 4 wherein the pressure swing adsorption module comprises a rotary pressure swing adsorption module.

6. The high temperature fuel cell power generation system of claim 4 wherein the pressure swing adsorption module comprises a multistage pressure swing adsorption module, said multistage pressure swing adsorption module comprising:
 a first stage operable to recover hydrogen gas from the fuel cell anode exhaust gas;
 a second stage operable to concentrate carbon dioxide gas from the fuel cell exhaust gases.

7. The high temperature fuel cell power generation system of claim 1 wherein the high temperature fuel cell is a molten carbonate fuel cell.

8. The high temperature fuel cell power generation system of claim 7 wherein the gas separation means is additionally operable to concentrate carbon dioxide gas from the fuel cell exhaust gases, and to provide at least a portion of such concentrated carbon dioxide gas for recycle to the cathode inlet.

9. The high temperature fuel cell power generation system of claim 8 wherein the gas separation means is operable to provide a further portion of the concentrated carbon dioxide gas for export from the generation system to prevent its release into the atmosphere.

10. The high temperature fuel cell power generation system of claim 9 wherein the gas separation means comprises a pressure swing adsorption module.

11. The high temperature fuel cell power generation system of claim 10 wherein the pressure swing adsorption module comprises a rotary pressure swing adsorption module.

12. The high temperature fuel cell power generation system of claim 10 wherein the pressure swing adsorption module comprises a multistage pressure swing adsorption module, said multistage pressure swing adsorption module comprising:
  a first stage operable to recover hydrogen gas from the fuel cell anode exhaust gas;
  a second stage operable to concentrate carbon dioxide gas from the fuel cell exhaust gases.

13. The high temperature fuel cell power generation system of claim 1, further comprising a compressor for compressing the recovered hydrogen fuel, wherein the energy recovery means provides at least a portion of the recovered energy to drive mechanical loads associated with operation of the compressor.

14. The high temperature fuel cell power generation system of claim 1, wherein the high temperature fuel cell is a molten carbonate fuel cell and at least a portion of an exhaust from the gas separation means is provided to the cathode inlet.

15. The high temperature fuel cell power generation system of claim 1, wherein the energy recovery means comprises a free rotor turbocompressor.

16. The high temperature fuel cell power generation system of claim 4, wherein the pressure swing adsorption module comprises an adsorbent and a catalyst.

17. The high temperature fuel cell power generation system of claim 4 configured such that at least a portion of an exhaust from the pressure swing adsorption module is recycled to a pressure swing adsorption module feed.

18. The high temperature fuel cell power generation system of claim 17 configured such that at least a portion of the exhaust from the pressure swing adsorption module is recompressed using energy from at least one of the fuel cell exhaust gases.

19. The high temperature fuel cell power generation system of claim 1 configured such that the recovered hydrogen gas provided for export is recompressed using energy from at least one of the fuel cell exhaust gases.

20. A mobile solid oxide fuel cell power generation system comprising:
  a solid oxide fuel cell having an anode inlet and exhaust, and a cathode inlet and exhaust;
  a pressure swing adsorption module operable to recover hydrogen gas from the anode exhaust of the solid oxide fuel cell and to provide at least a portion of such hydrogen gas for recycle to the anode inlet of the solid oxide fuel cell;
  energy recovery means operable to recover energy from the solid oxide fuel cell exhaust gases and to provide substantially all of such recovered energy to drive mechanical loads within the generation system; and
  a polymer electrolyte membrane fuel cell that includes an anode and that receives at least a portion of the recovered hydrogen as an anode fuel;
  wherein at least a portion of the power output from the generation system is provided to power drive means for a vehicle.

21. The mobile high temperature fuel cell power generation system of claim 20 wherein the pressure swing adsorption module is additionally operable to provide a portion of the recovered hydrogen gas for export from the generation system as hydrogen fuel.

22. The mobile high temperature fuel cell power generation system of claim 21 wherein the pressure swing adsorption module comprises a rotary pressure swing adsorption module.

23. A fuel cell power generation system comprising:
  a solid oxide fuel cell having an anode inlet and exhaust, and a cathode inlet and exhaust;
  a pressure swing adsorption module configured to recover hydrogen gas from the anode exhaust;
  energy recovery means for recovering energy from the solid oxide fuel cell exhaust gases and providing at least a portion of the recovered energy to drive mechanical loads associated with the operation of the pressure swing adsorption module; and
  a polymer electrolyte membrane fuel cell that includes an anode and that receives at least a portion of the recovered hydrogen gas as an anode fuel.

24. The fuel cell power generation system of claim 23, further comprising a compressor for compressing the recovered hydrogen gas, wherein the energy recovery means provides at least a portion of the recovered energy to drive mechanical loads associated with operation of the compressor.

25. A fuel cell system comprising:
  a high temperature fuel cell having an anode inlet and exhaust, and a cathode inlet and exhaust;
  a low temperature fuel cell having an anode inlet; and
  gas separation means operable to recover hydrogen gas from the high temperature fuel cell anode exhaust, to provide at least a portion of the recovered hydrogen gas to the high temperature fuel cell anode inlet, and to provide at least a portion of the recovered hydrogen gas to the low temperature fuel cell anode inlet.

26. The fuel cell system of claim 25, further comprising energy recovery means operable to recover energy from at least one of the high temperature fuel cell exhaust gases and to provide at least a portion of such recovered energy to drive mechanical loads associated with operation of the gas separation means.

27. The fuel cell system of claim 25, wherein the pressure swing adsorption module comprises a rotary pressure swing adsorption module.

28. The fuel cell system of claim 25 configured such that at least a portion of the recovered hydrogen gas from the high temperature fuel cell anode exhaust is recompressed using energy from at least one of the high temperature fuel cell exhaust gases.

29. The fuel cell system of claim 25, wherein the low temperature fuel cell is a polymer electrolyte membrane fuel cell.

30. The fuel cell system of claim 25, wherein the low temperature fuel cell is associated with a vehicle.

* * * * *